United States Patent
Park

(10) Patent No.: US 12,254,162 B2
(45) Date of Patent: Mar. 18, 2025

(54) TOUCH SENSING UNIT AND DISPLAY DEVICE INCLUDING THE SAME

(71) Applicant: Samsung Display Co., Ltd., Yongin-Si (KR)

(72) Inventor: Won Sang Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/681,056

(22) Filed: Feb. 25, 2022

(65) Prior Publication Data

US 2022/0382398 A1 Dec. 1, 2022

(30) Foreign Application Priority Data

May 31, 2021 (KR) .................. 10-2021-0070204

(51) Int. Cl.
*G06F 3/046* (2006.01)
*G06F 3/041* (2006.01)
*G06F 3/044* (2006.01)

(52) U.S. Cl.
CPC ............ *G06F 3/046* (2013.01); *G06F 3/0412* (2013.01); *G06F 3/0446* (2019.05); *G06F 2203/04107* (2013.01)

(58) Field of Classification Search
CPC ...................................... G06F 3/046
See application file for complete search history.

(56) References Cited

U.S. PATENT DOCUMENTS

| 2012/0162128 | A1* | 6/2012 | Hyoung | G06F 3/0443 |
| | | | | 345/173 |
| 2015/0062067 | A1* | 3/2015 | Hong | G06F 3/0412 |
| | | | | 345/174 |
| 2016/0139701 | A1* | 5/2016 | Wang | G06F 3/046 |
| | | | | 345/174 |
| 2020/0241672 | A1* | 7/2020 | Kushnir | G01S 13/87 |
| 2020/0379605 | A1* | 12/2020 | Zhang | G06F 3/0443 |

FOREIGN PATENT DOCUMENTS

| KR | 2010-0071208 A | 6/2010 |
| KR | 2015-0140097 A | 12/2015 |
| KR | 2016-0122747 A | 10/2016 |
| KR | 10-1757583 B1 | 7/2017 |
| KR | 2018-0043216 A | 4/2018 |
| KR | 10-2099753 B1 | 4/2020 |
| KR | 10-2187703 B1 | 12/2020 |
| KR | 2020-0143628 A | 12/2020 |
| KR | 2016-0061481 A | 10/2021 |

* cited by examiner

*Primary Examiner* — Robin J Mishler
(74) *Attorney, Agent, or Firm* — Innovation Counsel LLP

(57) ABSTRACT

Provided are a touch sensing unit and a display device including the same. The touch sensing unit includes a substrate including glass or a polymer resin, and a sensor electrode layer including sensor electrodes and sensor lines disposed on the substrate and a sensor insulating film configured to cover the sensor electrodes and the sensor lines. The sensor electrodes emit an electromagnetic wave according to transmission signals of the sensor lines. The sensor electrodes transmit reception signals to the sensor lines according to the electromagnetic wave received from the outside. The electromagnetic wave has a frequency of 10 GHz to 100 GHz.

4 Claims, 17 Drawing Sheets

FIG.12
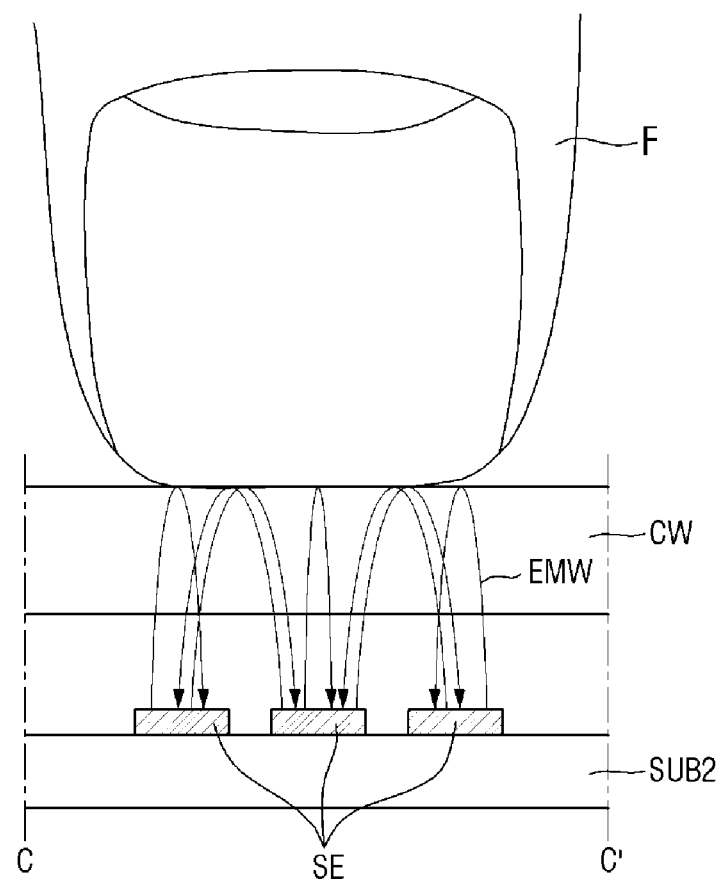
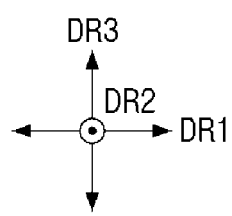

TOUCH SENSING UNIT AND DISPLAY DEVICE INCLUDING THE SAME

CROSS-REFERENCE TO RELATED APPLICATION

This application claims priority to Korean Patent Application No. 10-2021-0070204 filed on May 31, 2021, and all the benefits accruing therefrom under 35 U.S.C. § 119, the content of which in its entirety is herein incorporated by reference.

BACKGROUND

1. Field

The present disclosure generally relates to a display device. More particularly, the present disclosure relates to a touch sensing unit and a display device including the same.

2. Description of the Related Art

As an information society develops, the demand for a display device for displaying an image is increasing in various forms. For example, the display device is applied to various electronic devices such as a smart phone, a digital camera, a notebook computer, a navigation system, and a smart television. The display device can include a touch sensing unit for sensing a user's touch as one of input interfaces.

The touch sensing unit can include a plurality of touch electrodes driven in a capacitive method to sense a user's contact touch. However, in the case of the capacitive method, it is difficult for a distance of a user's proximity touch close to the display device to be increased.

SUMMARY

Embodiments of the current disclosure to provide a touch sensing unit capable of sensing a proximity touch in addition to a contact touch.

Embodiments of the current disclosure to provide a display device including a touch sensing unit capable of sensing a proximity touch in addition to a contact touch.

According to an embodiment of the present disclosure, a touch sensing unit includes a substrate including glass or a polymer resin, and a sensor electrode layer including sensor electrodes and sensor lines disposed on the substrate and a sensor insulating film configured to cover the sensor electrodes and the sensor lines. The sensor electrodes emit an electromagnetic wave according to transmission signals of the sensor lines. The sensor electrodes transmit reception signals to the sensor lines according to the electromagnetic wave received from the outside. The electromagnetic wave has a frequency of 10 GHz to 100 GHz.

According to an embodiment of the present disclosure, a display device includes a display panel including a plurality of light emitting regions, a touch sensing unit disposed on the display panel and including sensor electrodes, and a touch driving circuit configured to transmit transmission signals to the sensor electrodes to transmit an electromagnetic wave from the sensor electrodes, and receive reception signals from the sensor electrodes according to the electromagnetic wave received by the sensor electrodes. The electromagnetic wave has a frequency of 10 GHz to 100 GHz.

The touch driving circuit may transmit the transmission signals to the sensor electrodes during a first period and may receive the reception signals from the sensor electrodes during a second period.

The electromagnetic wave may have frequencies of 25 GHz to 27 GHz, 33 GHz to 35 GHz, 47 GHz to 49 GHz, and 82 GHz to 85 GHz.

Each of the sensor electrodes may have a mesh shape or net shape.

Among the sensor electrodes, P×Q sensor electrodes corresponding to P (P is an integer greater than or equal to 2) sensor electrodes arranged in a first direction and Q (Q is an integer greater than or equal to 2) sensor electrodes arranged in a second direction intersecting the first direction are defined as one sensor unit.

Each of the sensor electrodes may have at least one of a square planar shape, a rectangular planar shape, and a circular planar shape.

A gain of each of the sensor electrodes may be smaller than 2 dBi.

The display device may further include sensor lines correspondingly connected one-to-one to the sensor electrodes, and touch pads correspondingly connected one-to-one to the sensor lines.

Each of the sensor lines has a winding pattern, and a length of a first sensor line connected to a first sensor electrode among the sensor electrodes and a length of a second sensor line connected to a second sensor electrode among the sensor electrodes may be substantially equal.

A length of the winding pattern of the first sensor line may be different from a length of the winding pattern of the second sensor line.

The first sensor line may be connected to a first touch pad among the touch pads. The second sensor line may be connected to a second touch pad among the touch pads. A minimum distance between the first sensor electrode and the first touch pad may be larger than a minimum distance between the second sensor electrode and the second touch pad. The length of the winding pattern of the first sensor line may be shorter than the length of the winding pattern of the second sensor line.

According to an embodiment of the present disclosure, a display includes a display panel including a plurality of light emitting regions, a touch sensing unit disposed on the display panel and including transmission electrodes and reception electrodes, and a touch driving circuit configured to transmit transmission signals to the transmission electrodes to transmit an electromagnetic wave from the transmission electrodes, and receive reception signals from the reception electrodes according to the electromagnetic wave received by the reception electrodes. The electromagnetic wave has a frequency of 10 GHz to 100 GHz.

A number of transmission electrodes may be smaller than a number of reception electrodes.

The transmission electrodes may be arranged in a first direction and a second direction intersecting the first direction. The reception electrodes may be arranged in the first direction and the second direction.

One transmission electrode among the transmission electrodes, and the reception electrodes disposed in a first diagonal direction and a second diagonal direction from the transmission electrode among the reception electrodes may be defined as one sensor unit. The first diagonal direction may be a direction between the first direction and the second direction. The second diagonal direction may be orthogonal to the first diagonal direction.

The display device may further include transmission lines commonly connected to the transmission electrodes, and reception lines correspondingly connected one-to-one to the reception electrodes.

According to an embodiment of the present disclosure, a display device includes a display panel including a plurality of light emitting regions, a touch sensing unit disposed on the display panel and including sensor electrodes, a touch driving circuit configured to transmit transmission signals to the sensor electrodes to transmit an electromagnetic wave from the sensor electrodes, and receive reception signals from the sensor electrodes according to the electromagnetic wave received by the sensor electrodes, and an optical member disposed on the touch sensing unit.

The optical member may include an anti-reflection member configured to block light incident from an outside to the display panel from being reflected and proceeding to the outside.

The optical member may include glass or a polymer resin.

The display device may further include an anti-reflection member disposed between the display panel and the touch sensing unit and configured to block light incident from an outside to the display panel from being reflected and proceeding to the outside.

BRIEF DESCRIPTION OF THE DRAWINGS

The above and other features of the inventive concept will become more apparent by describing in detail embodiments thereof with reference to the accompanying drawings, in which:

FIG. 12 is an example view illustrating contact touch sensing using the sensor electrodes taken along line C-C' in FIG. 6;

DETAILED DESCRIPTION OF THE EMBODIMENTS

Figure 1:
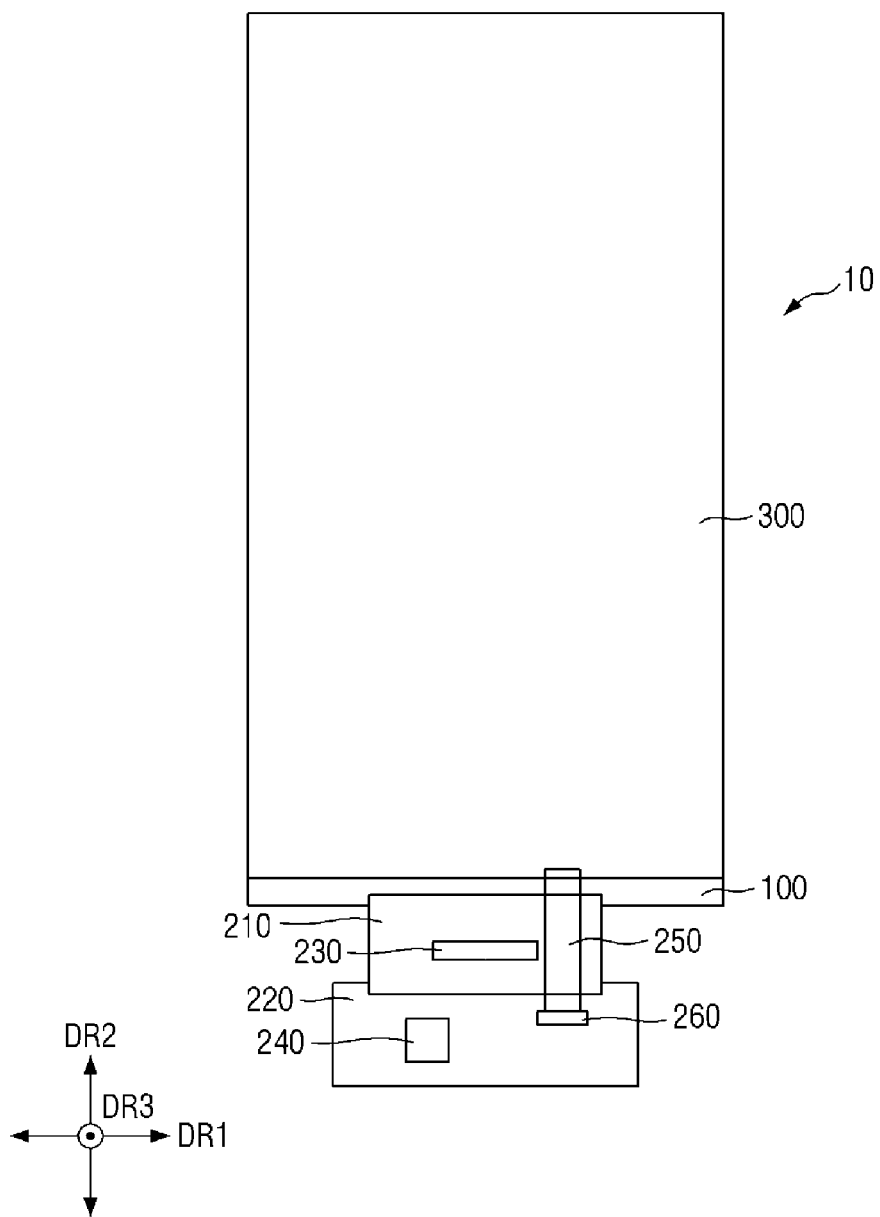
FIGS. 1 and 2 are plan views illustrating a display device according to one embodiment.

The inventive concept now will be described more fully hereinafter with reference to the accompanying drawings, in which various embodiments are shown. This inventive concept may, however, be embodied in many different forms, and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the inventive concept present disclosure will be described in detail with reference to the accompanying drawings.

Figure 2:
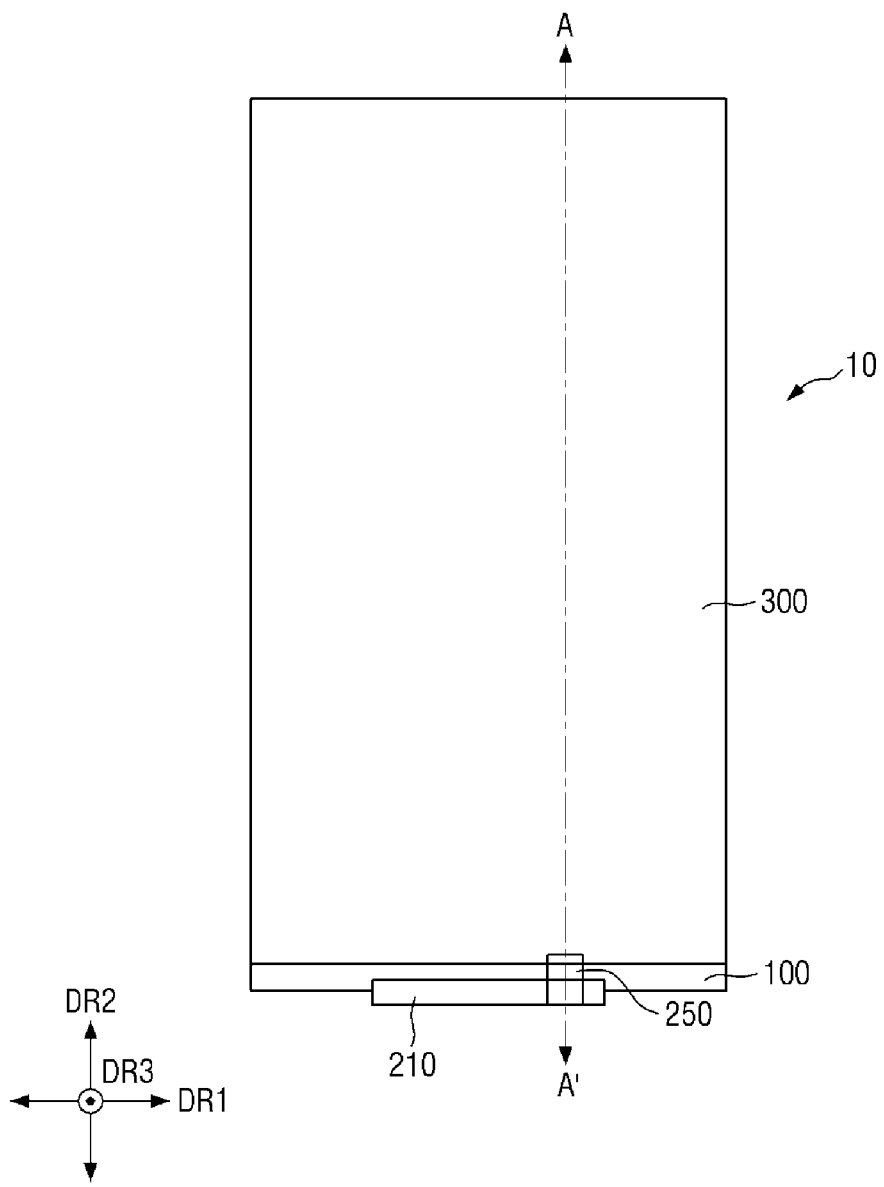

FIGS. 1 and 2 are plan views illustrating a display device according to one embodiment.

Referring to FIGS. 1 and 2, a display device 10 according to one embodiment includes a display panel 100, a display flexible film 210, a circuit board 220, a display driving circuit 230, a touch driving circuit 240, a touch flexible film 250, a connector 260, and a touch sensing unit 300.

FIG. 1 illustrates a plan view of the display device 10 in the case in which the display flexible film 210 and the touch flexible film 250 are unfolded without being bent. FIG. 2 illustrates a plan view of the display device 10 in the case in which the display flexible film 210 and the touch flexible film 250 are bent.

In FIGS. 1 and 2, a first direction DR1 indicates a lateral direction of the display device 10, a second direction DR2 indicates a longitudinal direction of the display device 10, and a third direction DR3 indicates a thickness direction of the display device 10. In this case, "a left side", "a right side", "an upper side", and "a lower side" indicate directions when the display device 10 is viewed in a plan view. For example, "the left side" refers to one side in the first direction DR1, "the right side" refers to the other side in the first direction DR1, "the upper side" refers to one side in the second direction DR2, and "the lower side" refers to the other side in the second direction DR2. Further, "an upper portion" indicates one side in the third direction DR3, and "a lower side" indicates the other side in the third direction DR3.

The display panel 100 may have a rectangular planar shape having short sides in the first direction DR1 and long sides in the second direction DR2. In the display panel 100, a corner where the short side in the first direction DR1 and the long side in the second direction DR2 meet may be formed at a right angle or in a rounded shape having a predetermined curvature. The display panel 100 may have a quadrangular shape other than a rectangular shape, a polygonal shape other than the quadrangular shape, a circular shape, an oval shape, or an irregular planar shape.

The display panel 100 may include a display region where a plurality of light emitting regions which emit light are disposed and a non-display region disposed around the display region. The non-display region may be disposed to surround the display region. A plurality of display pads may be disposed in the non-display region at a lower edge of the display panel 100.

The display flexible film 210 may be connected to the plurality of display pads of the display panel 100 through a conductive adhesive member such as an anisotropic conductive film. Accordingly, the display panel 100 and the display flexible film 210 may be electrically connected to each other.

Further, the display flexible film 210 may be connected to a plurality of circuit pads of the circuit board 220 through a conductive adhesive member such as an anisotropic conductive film. Accordingly, the display flexible film 210 and the circuit board 220 may be electrically connected to each other.

The display flexible film 210 may be a flexible printed circuit board or a chip on film. The circuit board 220 may be a flexible printed circuit board or a printed circuit board.

The display driving circuit 230 may be disposed on the display flexible film 210. The display driving circuit 230 outputs signals and voltages for driving the display panel 100. For example, the display driving circuit 230 may output data voltages to data lines of the display panel 100. Further, the display driving circuit 230 may output power voltages to power lines of the display panel 100. In addition, the display driving circuit 230 may output scan control signals to a scan driver of the display panel 100.

The display driving circuit 230 may be formed as an integrated circuit (IC) and adhered to the display flexible film 210. Alternatively, the display driving circuit 230 may be adhered to the display panel 100 exposed without being covered by the touch sensing unit 300. Alternatively, the display driving circuit 230 may be adhered to the circuit board 220.

The touch sensing unit 300 may be disposed on the display panel 100. A planar shape of the touch sensing unit 300 may follow the planar shape of the display panel 100. For example, the touch sensing unit 300 may have a rectangular planar shape having short sides in the first direction DR1 and long sides in the second direction DR2. In the touch sensing unit 300, a corner where the short side in the first direction DR1 and the long side in the second direction DR2 meet may be formed in a rounded shape having a predetermined curvature or at a right angle. The touch sensing unit 300 may have a quadrangular shape other than a rectangular shape, a polygonal shape other than the quadrangular shape, a circular shape, an oval shape, or an irregular planar shape.

The touch sensing unit 300 may include a touch sensor region where a plurality of sensor electrodes which sense a user's touch are disposed and a touch peripheral region disposed around the touch sensor region. The touch peripheral region may be disposed to surround the touch sensor region. A plurality of touch pads may be disposed in the touch peripheral region at a lower edge of the touch sensing unit 300.

The touch flexible film 250 may be connected to the plurality of touch pads of the touch sensing unit 300 through a conductive adhesive member such as an anisotropic conductive film. Accordingly, the touch sensing unit 300 and the display flexible film 210 may be electrically connected to each other.

Further, the touch flexible film 250 may be connected to the connector 260 of the circuit board 220. Accordingly, the touch flexible film 250 and the circuit board 220 may be electrically connected to each other.

The touch flexible film 250 may be a flexible printed circuit board or a chip on film.

The touch driving circuit 240 may be formed as an integrated circuit (IC) and adhered to the circuit board 220. Alternatively, the touch driving circuit 240 may be adhered to the touch flexible film 250.

The touch driving circuit 240 transmits transmission signals to the sensor electrodes of the touch sensing unit 300, and accordingly, an electromagnetic wave may be emitted from the sensor electrodes of the touch sensing unit 300. Further, the touch driving circuit 240 may receive reception signals from the sensor electrodes of the touch sensing unit 300 according to an electromagnetic wave received by the sensor electrodes of the touch sensing unit 300. The touch driving circuit 240 may sense an operator's touch according to the reception signals. A touch may include a contact touch and a proximity touch. The contact touch refers to direct contact of an object such as a human finger or pen with a cover window (CW in FIGS. 3, 4, and 5) disposed on a sensor electrode layer. The proximity touch refers to a case in which an object such as a human finger or pen is located close to and away from the cover window (CW in FIGS. 3, 4, and 5), such as hovering.

Figure 3:
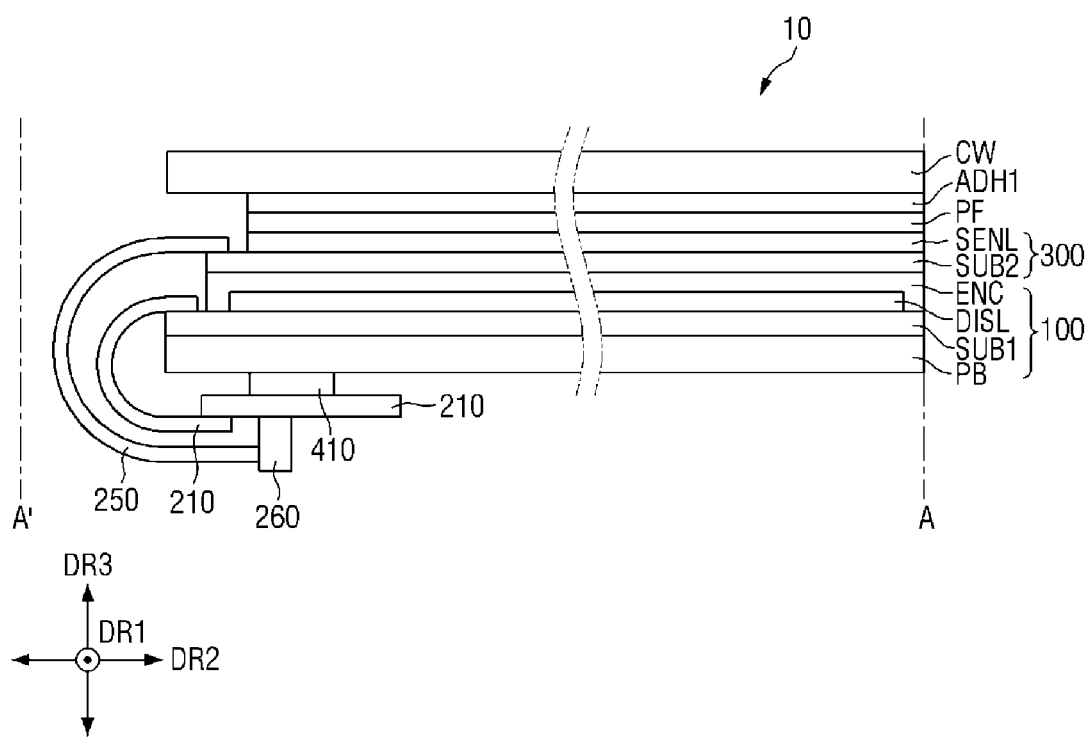
FIG. 3 is a cross-sectional view illustrating one example of the display device taken along line A-A' in FIG. 2.

FIG. 3 is a cross-sectional view illustrating one example of the display device taken along line A-A' in FIG. 2. FIG. 3 illustrates a cross-sectional view of the display device 10 in the case in which the display flexible film 210 and the touch flexible film 250 are bent to be disposed under the display panel 100 as shown in FIG. 2.

Referring to FIG. 3, the display device 10 according to one embodiment further includes an anti-reflection member PF, a first adhesive member ADH1, and the cover window CW in addition to the display panel 100 and the touch sensing unit 300.

The display panel 100 may include a first substrate SUB1, a display layer DISL, an encapsulation layer ENC, and a lower panel cover PB.

The first substrate SUB1 may be made of an insulating material such as glass, quartz, a polymer resin, or the like. The first substrate SUB1 may be a rigid substrate or a flexible substrate which may be bent, folded, or rolled.

The display layer DISL may be disposed on the first substrate SUB1 which may be disposed on the lower panel PB. The display layer DISL may be a layer including a plurality of light emitting regions which emit light. The display layer DISL may include a thin film transistor layer in which thin film transistors are disposed, a light emitting element layer in which light emitting elements emitting light are disposed, and an encapsulation layer for encapsulating the light emitting element layer.

The display layer DISL may further include scan lines, data lines, power lines, and a scan driver formed in the thin film transistor layer, in addition to the plurality of light emitting regions. The data lines, the power lines, and the scan driver may be electrically connected to the display driving circuit 230 through the display pads. The scan lines may be electrically connected to the scan driver.

The encapsulation layer ENC may be disposed on the display layer DISL. The encapsulation layer ENC is a layer for preventing the penetration of external oxygen or moisture into the light emitting elements of the display layer DISL. The encapsulation layer ENC may include at least one inorganic film. Alternatively, the encapsulation layer ENC may include a filling layer and a sealing member. The filling layer may be disposed on the display layer DISL. The sealing member may be disposed at an edge of the first substrate SUB1 to surround the display layer DISL and the filling layer. The sealing member may be a frit adhesive layer, an ultraviolet curable resin, or a thermosetting resin.

The touch sensing unit 300 may be disposed on the display panel 100. A separate adhesive member may be additionally disposed between the display panel 100 and the touch sensing unit 300.

The touch sensing unit 300 may include a second substrate SUB2 and a sensor electrode layer SENL. The touch sensing unit 300 may be a film-type touch sensing member.

The second substrate SUB2 may be made of an insulating material such as glass, quartz, a polymer resin, or the like. The second substrate SUB2 may be a rigid substrate or a flexible substrate which may be bent, folded, or rolled.

The sensor electrode layer SEN may include a touch sensor region where a plurality of sensor electrodes which sense an operator's touch are disposed and a touch peripheral region where a plurality of touch pads are disposed. The touch sensor region of the sensor electrode layer SENL may overlap the display region of the display panel 100 in the third direction DR3. An area of the touch sensor region of the sensor electrode layer SENL may be substantially the same as an area of the display region of the display panel 100. The touch peripheral region of the sensor electrode layer SENL may overlap the non-display region of the display panel 100 in the third direction DR3. An area of the touch peripheral region of the sensor electrode layer SENL may be substantially the same as the area of the non-display region of the display panel 100.

The anti-reflection member PF may be disposed on the touch sensing unit 300. The anti-reflection member PF may serve to prevent deterioration of image visibility of the display panel 100 due to reflection of external light. The anti-reflection member PF may include a retardation film and a linear polarizer. The retardation film may include at least one of a $\lambda/4$ (quarter-wave) plate and a $\lambda/2$ (half-wave) plate. Alternatively, the anti-reflection member PF may include a plurality of color filters. The anti-reflection member PF may be referred to as an optical member.

The cover window CW may be disposed on the anti-reflection member PF. The cover window CW may include a material having high light transmittance. The cover window CW may include a polymer resin such as polyimide or glass. The cover window CW may be attached onto the anti-reflection member PF by the first adhesive member ADH1 such as an optically clear adhesive (OCA) film. The cover window CW may be referred to as an optical member.

The lower panel cover PB may be disposed under the display panel 100. The lower panel cover PB may be attached to a lower surface of the display panel 100 through an adhesive member. The adhesive member may be a pressure sensitive adhesive (PSA). The lower panel cover PB may include at least one of a light blocking member for absorbing light incident from the outside, a buffer member for absorbing an impact from the outside, and a heat dissipation member for efficiently dissipating heat of the display panel 100.

The light blocking member may be disposed under the display panel 100. The light blocking member blocks light transmission to prevent components disposed under the light blocking member, for example, a display circuit board 310 and the like from being viewed from above the display panel 100. The light blocking member may include a light absorption material such as a black pigment, a black dye, or the like.

The buffer member may be disposed under the light blocking member. The buffer member absorbs an external impact to prevent damage to the display panel 100. The buffer member may be made of a single layer or a plurality of layers. For example, the buffer member may be made of a polymer resin such as polyurethane, polycarbonate, polypropylene, polyethylene or the like, or may include a material having elasticity such as a sponge formed by foam-molding rubber, a urethane-based material, or an acrylic-based material.

The heat dissipation member may be disposed under the buffer member. The heat dissipation member may include a first heat dissipation layer including graphite, a carbon nanotube, or the like, and a second heat dissipation layer formed of a thin metal film such as copper, nickel, ferrite, or silver, capable of shielding electromagnetic waves and having excellent thermal conductivity.

The display flexible film 210 may be attached to a lower surface of the lower panel cover PB by an adhesive member 410. The adhesive member 410 may be a pressure sensitive adhesive.

As shown in FIG. 3, when the touch sensing unit 300 is disposed on the display panel 100, the anti-reflection member PF, the first adhesive member ADH1, and the cover window CW through which electromagnetic waves may pass may be disposed on the touch sensing unit 300. Accordingly, the touch sensing unit 300 may emit the electromagnetic waves, and receive the electromagnetic waves reflected from an object such as a human finger or pen disposed on the cover window CW to sense a user's touch.

Figure 4:
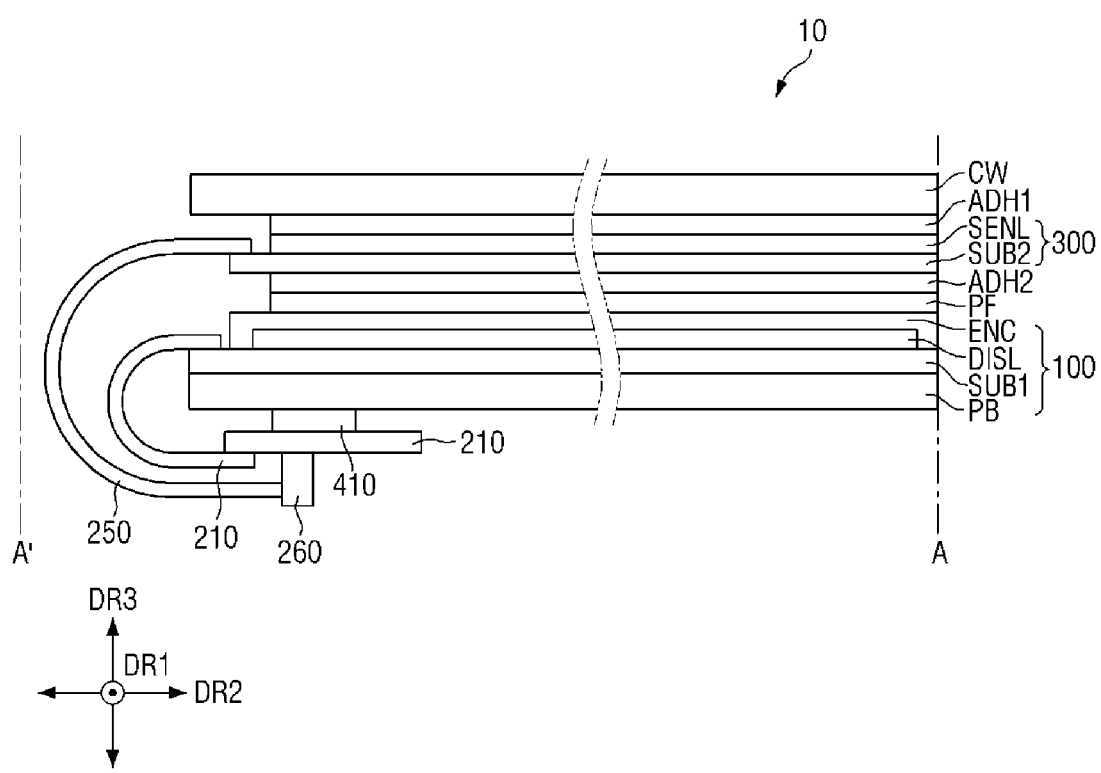
FIG. 4 is a cross-sectional view illustrating another example of the display device taken along line A-A' in FIG. 2.

FIG. 4 is a cross-sectional view illustrating another example of the display device taken along line A-A' in FIG. 2.

The embodiment in FIG. 4 is different from the embodiment in FIG. 3 in that the anti-reflection member PF is disposed on the display panel 100 and the touch sensing unit 300 is disposed on the anti-reflection member PF. In FIG. 4, descriptions overlapping the embodiment in FIG. 3 will be omitted.

Referring to FIG. 4, the touch sensing unit 300 may be attached onto the anti-reflection member PF by a second adhesive member ADH2 which is a transparent adhesive member such as an OCA film. In this case, since a distance between the sensor electrode layer SENL of the touch sensing unit 300 and the display layer DISL of the display panel 100 may increase, the parasitic capacitance between sensor electrodes of the sensor electrode layer SENL of the touch sensing unit 300 and an electrode of the display layer DISL of the display panel 100 may be reduced. Accordingly, it is possible to reduce the influence of the sensor electrodes of the sensor electrode layer SENL of the touch sensing unit 300 by a voltage change of the electrode of the display layer DISL of the display panel 100. The electrode of the display layer DISL of the display panel 100 may be a common electrode 173 shown in FIG. 10.

Figure 5:
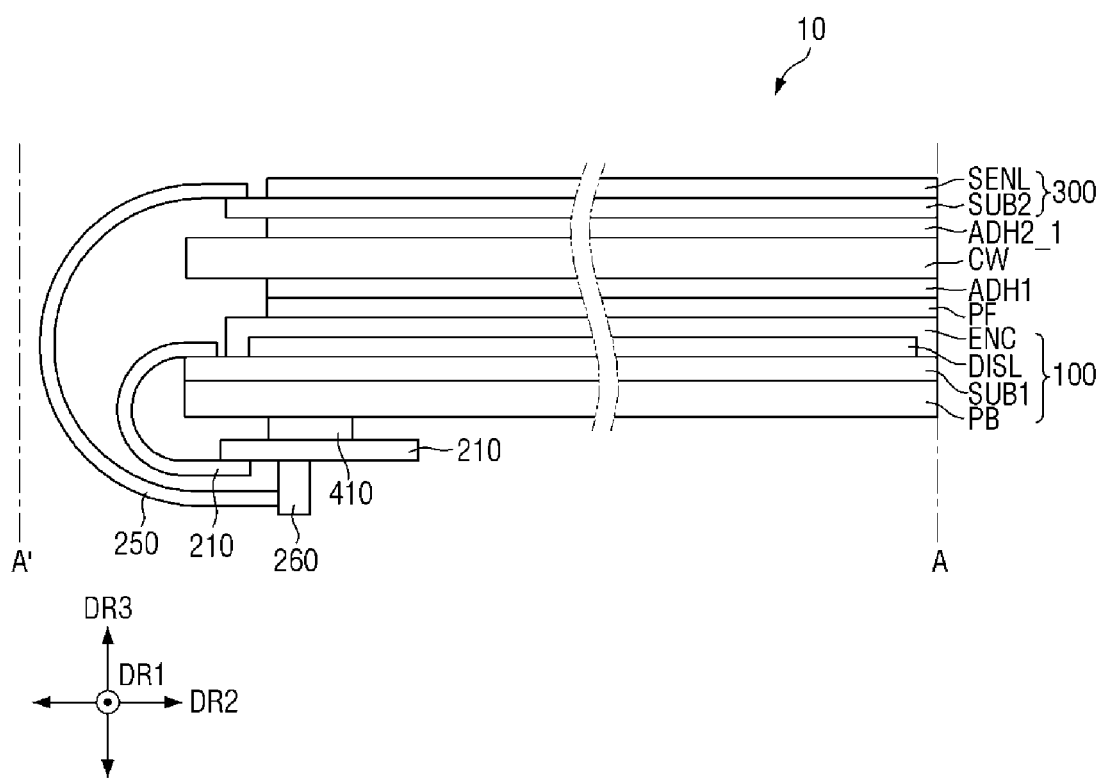
FIG. 5 is a cross-sectional view illustrating still another example of the display device taken along line A-A' in FIG. 2.

FIG. 5 is a cross-sectional view illustrating still another example of the display device taken along line A-A' in FIG. 2.

The embodiment in FIG. 5 is different from the embodiment in FIG. 3 in that the touch sensing unit 300 is disposed on the cover window CW. In FIG. 5, descriptions overlapping the embodiment in FIG. 3 will be omitted.

Referring to FIG. 5, the anti-reflection member PF may be disposed on the display panel 100, and the cover window CW may be attached to the anti-reflection member PF by the first adhesive member ADH1. The touch sensing unit 300 may be attached onto the cover window CW by a second adhesive member ADH2_1 which is a transparent adhesive member such as an OCA film. In this case, since a distance between the sensor electrode layer SENL of the touch sensing unit 300 and the display layer DISL of the display panel 100 may increase, the parasitic capacitance between the sensor electrodes of the sensor electrode layer SENL of the touch sensing unit 300 and the electrode of the display layer DISL of the display panel 100 may be reduced. Accordingly, it is possible to reduce the influence of the sensor electrodes of the sensor electrode layer SENL of the touch sensing unit 300 by the voltage change of the electrode of the display layer DISL of the display panel 100. The electrode of the display layer DISL of the display panel 100 may be the common electrode 173 shown in FIG. 10.

Further, since other components of the display device 10 are not disposed on the sensor electrode layer SENL of the touch sensing unit 300, transmission and reception of electromagnetic waves of the sensor electrode layer SENL may be more freely performed.

Figure 6:
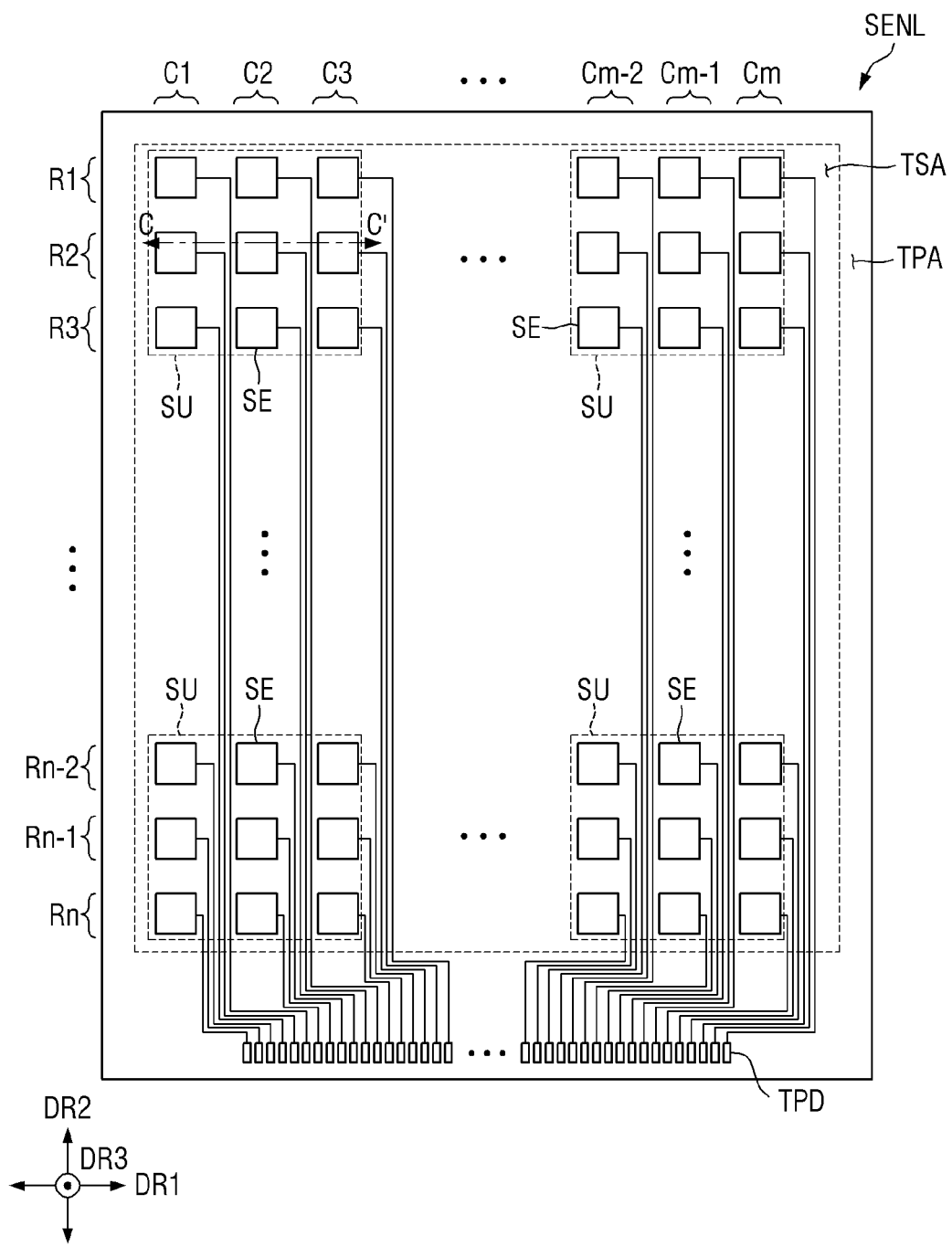
FIG. 6 is a layout view illustrating a touch sensing unit according to one embodiment.

FIG. 6 is a layout view illustrating the touch sensing unit according to one embodiment.

Referring to FIG. 6, the sensor electrode layer SENL may include a touch sensor region TSA and a touch peripheral region TPA. A planar shape of the touch sensor region TSA may follow the planar shape of the touch sensing unit 300. For example, the touch sensor region TSA may have a rectangular planar shape. The touch peripheral region TPA may be disposed to surround the touch sensor region TSA.

The touch sensor region TSA may include a plurality of sensor electrodes SE and a plurality of sensor lines SL. The touch peripheral region TPA may include a plurality of touch pads TPD disposed under the sensor electrode layer SENL.

The plurality of sensor electrodes SE may be disposed to be spaced apart from each other. The plurality of sensor electrodes SE may be electrically isolated from each other. The plurality of sensor electrodes SE may be disposed in a matrix form in the first direction DR1 and the second direction DR2. For example, the plurality of sensor electrodes SE may be disposed in first to nth rows R1 to Rn and first to mth columns C1 to Cm.

Among the plurality of sensor electrodes SE, P×Q sensor electrodes SE including P sensor electrodes SE arranged in the first direction DR1 and Q sensor electrodes SE arranged in the second direction DR2 may be defined as one sensor unit SU. The sensor unit SU may be a minimum unit in which the touch driving circuit 240 determines a touch position. In FIG. 6, an example in which the sensor unit SU includes nine sensor electrodes SE including three sensor electrodes SE arranged in the first direction DR1 and three sensor electrodes SE arranged in the second direction DR2 is described, but the embodiment of the specification is not limited thereto.

The plurality of sensor electrodes SE may be correspondingly connected one-to-one to the plurality of sensor lines SL. Further, the plurality of sensor lines SL may be correspondingly connected one-to-one to the plurality of touch pads TPD. That is, any one sensor line SL among the plurality of sensor lines SL may be disposed between the sensor electrode SE and the touch pad TPD to connect any one sensor electrode SE among the plurality of sensor electrodes SE and any one touch pad TPD among the plurality of touch pads TPD.

The touch pads TPD may be disposed at a lower edge of the touch sensing unit 300. The touch pads TPD may be correspondingly connected one-to-one to the pads of the touch flexible film 250. The touch pads TPD may be electrically connected to the pads of the touch flexible film 250 using an anisotropic conductive film. Accordingly, the plurality of sensor electrodes SE may be electrically connected to the touch driving circuit 240 of the circuit board 220 through the plurality of sensor lines SL, the plurality of touch pads TPD, and the touch flexible film 250.

Figure 7:
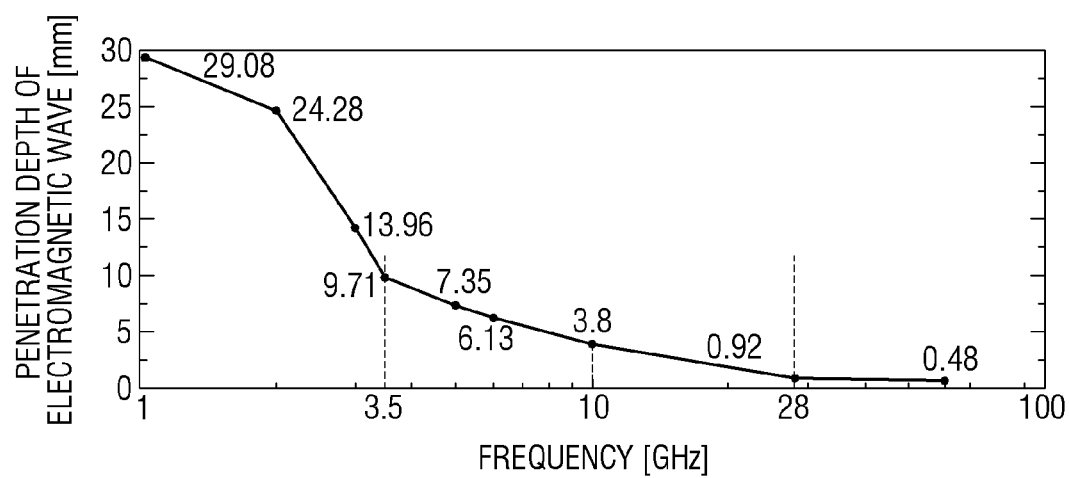
FIG. 7 is a graph illustrating a penetration depth according to a frequency of an electromagnetic wave.

Each of the sensor electrodes SE may emit the electromagnetic wave according to the transmission signal of the touch driving circuit 240, and may transmit the reception signal to the touch driving circuit 240 according to the received electromagnetic wave. In this case, a penetration depth of the electromagnetic wave may vary according to a frequency of the electromagnetic wave as shown in FIG. 7. The penetration depth of the electromagnetic wave may be approximately inversely proportional to the frequency of the electromagnetic wave. That is, the penetration depth of the electromagnetic wave may decrease as the frequency of the electromagnetic wave increases. For example, when the frequency of the electromagnetic wave is 1 GHz, the penetration depth of the electromagnetic wave may be approximately 29.08 mm. When the frequency of the electromagnetic wave is 3.5 GHz, the penetration depth of the electromagnetic wave may be approximately 9.71 mm. When the frequency of the electromagnetic wave is 10 GHz, the penetration depth of the electromagnetic wave may be approximately 3.8 mm. When the frequency of the electromagnetic wave is 28 GHz, the penetration depth of the electromagnetic wave may be approximately 0.92 mm. Accordingly, when the frequency of the electromagnetic wave is in a range from 10 to 100 GHz, the electromagnetic wave may not pass through the object used for an operator's touch, such as a human finger or pen, and may be absorbed or reflected. Accordingly, as each of the sensor electrodes SE emits the electromagnetic wave having a frequency of 10 to 100 GHz and receives the electromagnetic wave reflected from an object such as a human finger or pen, the user's touch may be sensed. That is, each of the sensor electrodes SE may sense the user's touch using the principle of an antenna which transmits and receives an electromagnetic wave.

In the case in which the frequency of the electromagnetic wave emitted by each of the sensor electrodes SE coincides with a frequency of an electromagnetic wave for weather observation of an artificial satellite, a frequency of an electromagnetic wave for fifth generation (5G) communication, and a frequency of an electromagnetic wave used for military purposes, the electromagnetic wave for weather observation of the artificial satellite, the electromagnetic wave for 5G communication, and the electromagnetic wave used for military purposes may act as touch noise when respectively received by each of the sensor electrodes SE. Accordingly, in order to reduce or remove the touch noise, the frequency band of the electromagnetic wave emitted by each of the sensor electrodes SE may be a frequency band other than a frequency band of the electromagnetic wave for weather observation of the artificial satellite, a frequency band of the electromagnetic wave for 5G communication, and a frequency band of the electromagnetic wave used for military purposes.

Figure 8:
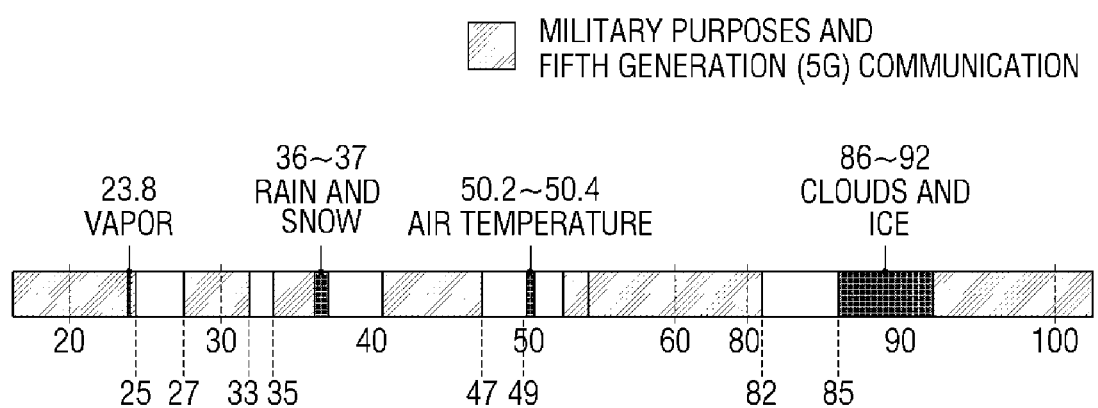
FIG. 8 is an example view illustrating a frequency of an electromagnetic wave emitted from sensor electrodes according to one embodiment.

As shown in FIG. 8, a frequency band of the electromagnetic wave used for observation of vapor by the artificial satellite may be approximately 23.8 GHz, and a frequency band of the electromagnetic wave used for observation of rain and snow by the artificial satellite may be approximately 36 GHz to 37 GHz. Further, a frequency band used for observation of an air temperature by the artificial satellite may be approximately 50.2 GHz to 50.4 GHz, and a frequency band used for observation of clouds and ice by the artificial satellite may be approximately 86 GHz to 92 GHz. In addition, the frequency bands of the electromagnetic wave for 5G communication may be approximately 24 GHz, 28 GHz, and 39 GHz. Accordingly, the frequency band of the electromagnetic wave emitted by of each of the sensor electrodes SE may be approximately 25 GHz to 27 GHz, 33 GHz to 35 GHz, 47 GHz to 49 GHz, and 82 GHz to 85 GHz.

In order to use the principle of an antenna transmitting and receiving an electromagnetic wave having a frequency of 10 to 100 GHz, a length in the first direction DR1 and a length in the second direction DR2 of each of the sensor electrodes SE may be approximately 1 mm to 5 mm, respectively. The length of the sensor electrode SE in the first direction DR1 and the length of the sensor electrode SE in the second direction DR2 may vary according to a frequency band for transmission and reception and the type of antenna. For example, when the sensor electrodes SE transmit and receive an electromagnetic wave having a frequency of 30 GHz and are designed as a dipole antenna, since a wavelength of the electromagnetic wave is 10 mm, the length in the first direction DR1 or the length in the second direction DR2 of each of the sensor electrodes SE may be 5 mm corresponding to a half wavelength. In contrast, when the sensor electrodes SE transmit and receive an electromagnetic wave having a frequency of 30 GHz and are designed as a patch antenna, the length in the first direction DR1 or the length in the second direction DR2 of each of the sensor electrodes SE may be 2.5 mm corresponding to a quarter wavelength. Further, each of the sensor electrodes SE may have a rectangular planar shape, a square planar shape, or a circular planar shape.

Since the electromagnetic wave emitted by the sensor electrodes SE detects an object which is present at a distance of 1 meter or less, unlike the electromagnetic wave of the antenna used for 5G communication, beam forming for a base station search is not required, and in addition, a gain of the sensor electrode SE may be smaller than 2 dBi.

As shown in FIG. 8, each of the sensor electrodes SE may emit the electromagnetic wave having a frequency of 10 to 100 GHz, and receive the electromagnetic wave reflected from an object such as a human finger or pen to sense the user's touch. That is, each of the sensor electrodes SE may sense the user's touch using the principle of an antenna which transmits and receives an electromagnetic wave.

Figure 9:
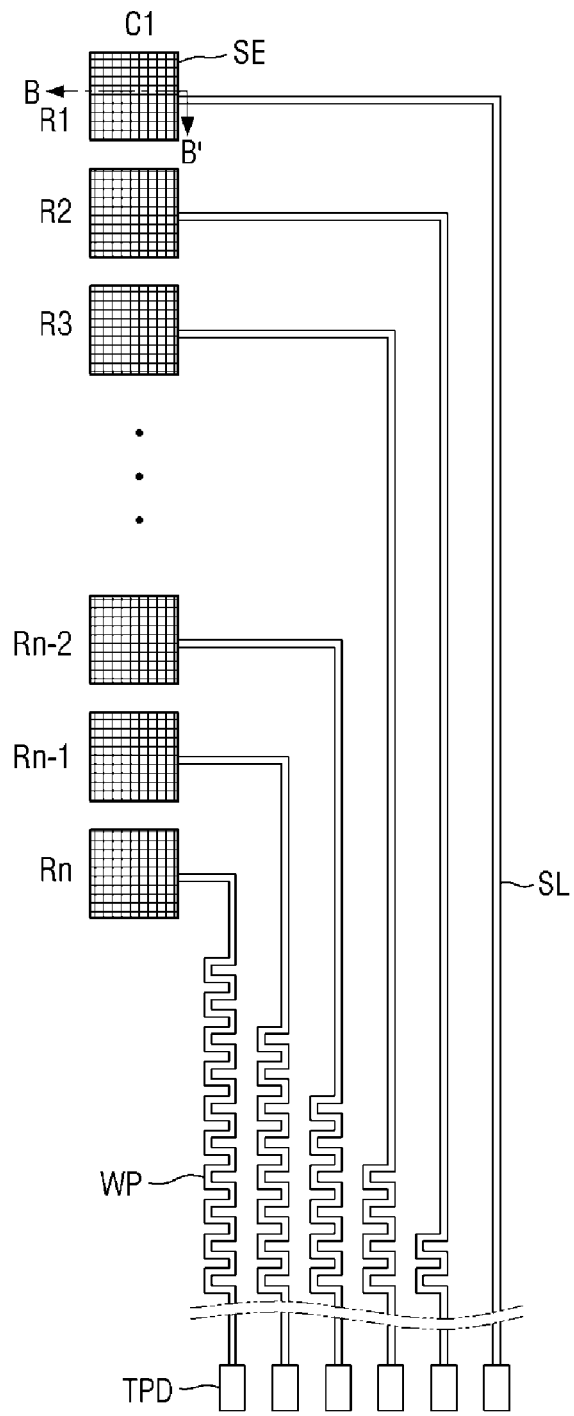
FIG. 9 is an example view illustrating one example of sensor lines connected to sensor electrodes disposed in a first column in FIG. 6.

FIG. 9 is an example view illustrating one example of the sensor lines connected to the sensor electrodes disposed in the first column in FIG. 6.

Referring to FIG. 9, each of the sensor electrodes SE may include an opaque metal material having low resistance. For example, the sensor electrodes SE may each be formed of a single layer or multilayer made of one of molybdenum (Mo), aluminum (Al), chromium (Cr), gold (Au), titanium (Ti), nickel (Ni), neodymium (Nd), and copper (Cu), or an alloy thereof. In this case, since the touch sensing unit 300 is disposed on the display panel 100, each of the sensor electrodes SE may have a mesh shape or net shape so as not to block light emitted from the display panel 100.

Meanwhile, a length of each of the sensor lines SL may vary according to the connection to the row in which the sensor electrode SE is disposed. For example, a distance between the sensor electrode SE disposed in the first row R1 and the touch pad TPD is the largest, and a distance between the sensor electrode SE disposed in the nth row Rn and the touch pad TPD is the smallest. Accordingly, a length of the sensor line SL connected to the sensor electrode SE disposed in the first row R1 may be the largest, and a length of the sensor line SL connected to the sensor electrode SE disposed in the nth row Rn may be the smallest. When the length of each of the sensor lines SL is changed, the impedance of each of the sensor lines SL may be changed.

In order to match the impedance between the sensor lines SL, the sensor lines SL connected to the sensor electrodes SE disposed in the second to nth rows R2 to Rn other than the sensor line SL connected to the sensor electrodes SE disposed in the first row R1 having the largest length may each include a winding pattern WP. In this case, lengths of the winding patterns WP in the sensor lines SL connected to the sensor electrodes SE disposed in the second to nth rows R2 to Rn may be different. The length of the winding pattern WP of the sensor line SL may increase from the second row R2 to the nth row Rn. For example, the length of the winding pattern WP of the sensor line SL connected to the sensor electrode SE disposed in the second row R2 may be the smallest, and the length of the winding pattern WP of the sensor line SL connected to the sensor electrode SE disposed in the nth row Rn may be the largest.

As shown in FIG. 9, in order to match the impedance between the sensor lines SL, each of the sensor lines SL except the outmost sensor line SL may include the winding pattern WP. Accordingly, the lengths of the sensor lines SL may be substantially the same. For example, a length of a first sensor line connected to a first sensor electrode among the sensor electrodes SE and a length of a second sensor line connected to a second sensor electrode among the sensor electrodes SE may be substantially the same. In this case, when a minimum distance between the first sensor electrode and a first touch pad among the touch pads TPD is larger than a minimum distance between the second sensor electrode and the second touch pad among the touch pads TPD, a length of a winding pattern of the first sensor line may be smaller than a length of a winding pattern of the second sensor line.

Figure 10:
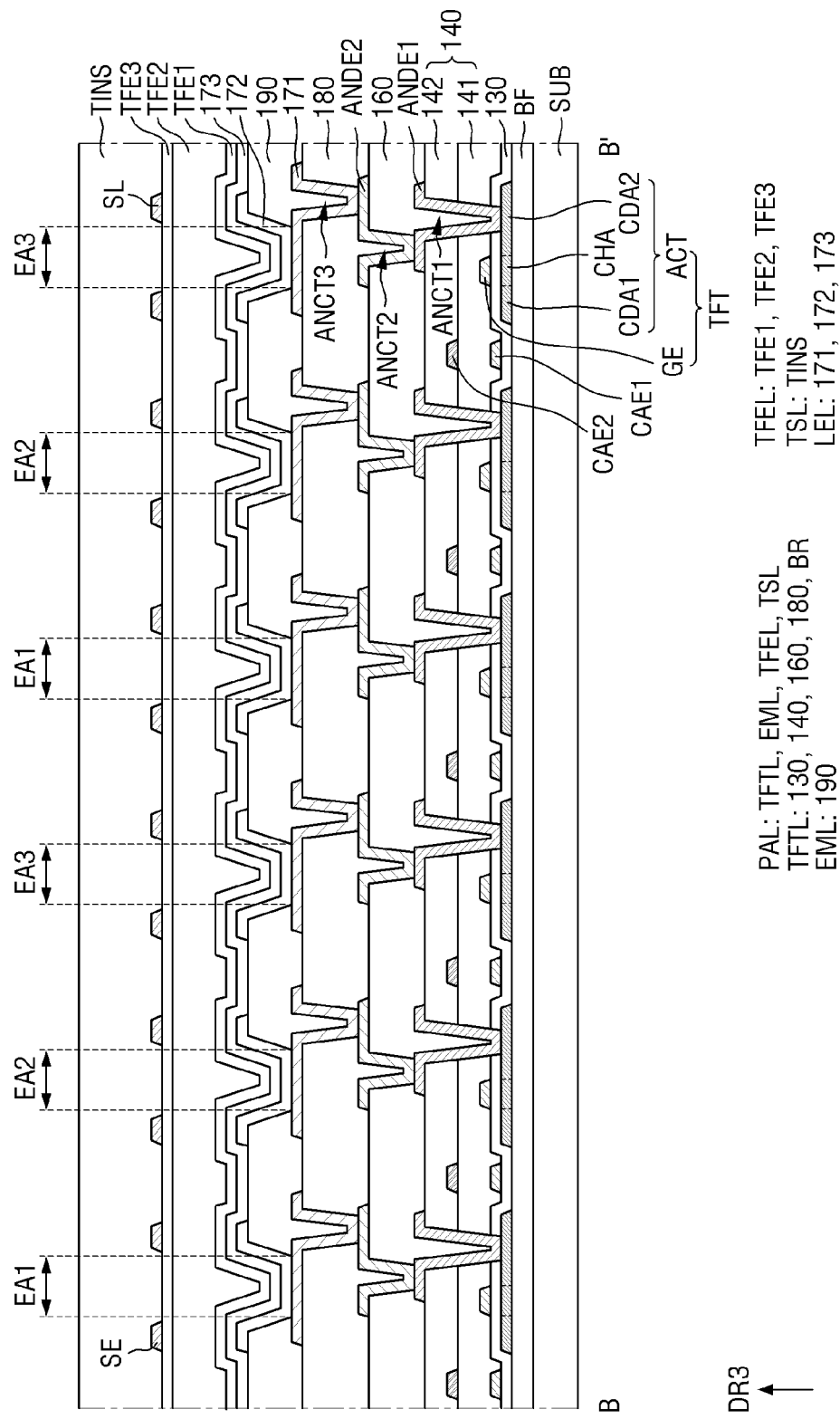
FIG. 10 is a cross-sectional view illustrating one example of the display device taken along line B-B' in FIG. 9.

FIG. 10 is a cross-sectional view illustrating one example of the display device taken along line B-B' in FIG. 9.

Referring to FIG. 10, the first substrate SUB1 may be made of an insulating material such as a polymer resin. For example, the first substrate SUB1 may include polyimide. The first substrate SUB1 may be a flexible substrate which may be bent, folded, or rolled.

A barrier film BR may be disposed on the first substrate SUB1. The barrier film BR is a film for protecting a thin film transistor of a thin film transistor layer TFTL and a light emitting layer 172 of a light emitting element layer EML from moisture penetrating through the first substrate SUB1 which is vulnerable to moisture permeation. The barrier film BR may be made of a plurality of inorganic films which are alternately stacked. For example, the barrier film BR may be formed of a multi-layered film in which one or more inorganic films of a silicon nitride layer, a silicon oxynitride layer, a silicon oxide layer, a titanium oxide layer, and an aluminum oxide layer are alternately stacked.

The thin film transistor layer TFTL including the thin film transistors TFT may be disposed on the barrier film BR.

Each of the thin film transistors TFT may include an active layer ACT and a gate electrode GE.

The active layer ACT of the thin film transistor TFT may be disposed on a buffer film BF. The active layer ACT may include a silicon semiconductor such as polycrystalline silicon, single crystal silicon, low-temperature polycrystalline silicon, or amorphous silicon. Alternatively, the active layer ACT may include an oxide semiconductor. In this case, the active layer ACT may include IGZO (indium (In), gallium (Ga), zinc (Zn), and oxygen (O)), IGZTO (indium (In), gallium (Ga), zinc (Zn), tin (Sn), and oxygen (O), or IGTO (indium (In), gallium (Ga), tin (Sn), and oxygen (O)).

The active layer ACT may include a channel region CHA, a first conductive region CDA1, and a second conductive region CDA2. The first conductive region CDA1 and the second conductive region CDA2 may be regions having conductivity by doping a silicon semiconductor or an oxide semiconductor with ions or impurities. The first conductive region CDA1 may serve as a source electrode, and the second conductive region CDA2 may serve as a drain electrode.

A gate insulating film 130 may be disposed on the active layer ACT of the thin film transistor TFT. The gate insulating film 130 may be formed of an inorganic film, for example, a silicon nitride layer, a silicon oxynitride layer, a silicon oxide layer, a titanium oxide layer, or an aluminum oxide layer.

The gate electrode GE of the thin film transistor TFT and a first capacitor electrode CAE1 may be disposed on the gate insulating film 130. The gate electrode GE may overlap the channel region CHA of the active layer ACT in the third direction DR3. The gate electrode GE and the first capacitor electrode CAE1 may each be formed of a single layer or multilayer made of one of molybdenum (Mo), aluminum (Al), chromium (Cr), gold (Au), titanium (Ti), nickel (Ni), neodymium (Nd), and copper (Cu), or an alloy thereof.

A first interlayer insulating film 141 may be disposed on the gate electrode GE and the first capacitor electrode CAE1. The first interlayer insulating film 141 may be formed of an inorganic film, for example, a silicon nitride layer, a silicon oxynitride layer, a silicon oxide layer, a titanium oxide layer, or an aluminum oxide layer.

A second capacitor electrode CAE2 may be disposed on the first interlayer insulating film 141. The second capacitor electrode CAE2 may overlap the first capacitor electrode CAE1 in the third direction DR3. Since the first interlayer insulating film 141 has a predetermined dielectric constant, a capacitor may be formed by the first capacitor electrode CAE1, the second capacitor electrode CAE2, and the first interlayer insulating film 141 disposed between the first capacitor electrode CAE1 and the second capacitor electrode CAE2. The second capacitor electrode CAE2 may be formed of a single layer or multilayer made of one of molybdenum (Mo), aluminum (Al), chromium (Cr), gold (Au), titanium (Ti), nickel (Ni), neodymium (Nd), and copper (Cu), or an alloy thereof.

A second interlayer insulating film 142 may be disposed on the first interlayer insulating film 141 and the second capacitor electrode CAE2. The second interlayer insulating film 142 may be formed of an inorganic film, for example, a silicon nitride layer, a silicon oxynitride layer, a silicon oxide layer, a titanium oxide layer, or an aluminum oxide layer. The second interlayer insulating film 142 may include a plurality of inorganic films.

A first anode connection electrode ANDE1 may be disposed on the second interlayer insulating film 142. The first anode connection electrode ANDE1 may be connected to the second conductive region CDA2 of the thin film transistor TFT through a first anode contact hole ANCT1 which exposes the second conductive region CDA2 by penetrating through the gate insulating film 130 and the interlayer insulating films 140. The first anode connection electrode ANDE1 may be formed of a single layer or multilayer made of one of molybdenum (Mo), aluminum (Al), chromium (Cr), gold (Au), titanium (Ti), nickel (Ni), neodymium (Nd), and copper (Cu), or an alloy thereof.

A first organic film 160 for planarization may be disposed on the second interlayer insulating film 142 and the first anode connection electrode ANDE1. The first organic film 160 may be formed of an organic film such as an acryl resin film, an epoxy resin film, a phenolic resin film, a polyamide resin film, a polyimide resin film, or the like.

A second anode connection electrode ANDE2 may be disposed on the first organic film 160. The second anode connection electrode ANDE2 may be connected to the first anode connection electrode ANDE1 through a second anode contact hole ANCT2 which exposes the first anode connection electrode ANDE1 by penetrating through the first organic film 160. The second anode connection electrode ANDE2 may be formed of a single layer or multilayer made of one of molybdenum (Mo), aluminum (Al), chromium (Cr), gold (Au), titanium (Ti), nickel (Ni), neodymium (Nd), and copper (Cu), or an alloy thereof.

A second organic film 180 for planarization may be disposed on the first organic film 160 and the second anode connection electrode ANDE2. The second organic film 180 may be formed of an organic film such as an acryl resin film, an epoxy resin film, a phenolic resin film, a polyamide resin film, a polyimide resin film, or the like.

In FIG. 10, an example in which the gate electrodes GE of the thin film transistors TFT are formed in a top gate manner of being located on the active layer ACT is shown, but the present disclosure is not limited thereto. Each of the thin film transistors TFT may be formed in a bottom gate manner in which the gate electrodes GE are located under the active layer ACT or a double gate manner in which the gate electrodes GE are located both on and under the active layer ACT.

A light emitting element layer EML including light emitting elements LEL and a bank 190 may be disposed on the second organic film 180. Each of the light emitting elements LEL includes a first light emitting electrode 171, a light emitting layer 172, and a second light emitting electrode 173. The first light emitting electrode 171 may be an anode, and the second light emitting electrode 173 may be a cathode.

The first light emitting electrode 171 may be formed on the second organic film 180. The first light emitting electrode 171 may be connected to the second anode connection electrode ANDE2 through a third anode contact hole ANCT3 which exposes the second anode connection electrode ANDE2 by penetrating through the second organic film 180.

In a top emission structure in which light is emitted in a direction of the second light emitting electrode 173 with respect to the light emitting layer 172, the first light emitting electrode 171 may be formed of a metal material having high reflectivity such as a stacked structure of aluminum and titanium (Ti/Al/Ti), a stacked structure of aluminum and ITO (ITO/Al/ITO), a stacked structure of silver and ITO (ITO/Ag/ITO), an APC alloy, and a stacked structure of the APC alloy and ITO (ITO/APC/ITO). The APC alloy is an alloy of silver (Ag), palladium (Pd), and copper (Cu).

The bank 190 may be disposed on the second organic film 180 and the first light emitting electrode 171. The bank 190 may be formed to partition the first light emitting electrodes 171 to serve to define light emitting units EA1, EA2, and EA3. That is, the bank 190 may be formed to cover edges of the first light emitting electrodes 171. The bank 190 may be formed to cover the third anode contact hole ANCT3. The bank 190 may be formed of an organic film such as an acryl resin film, an epoxy resin film, a phenolic resin film, a polyamide resin film, a polyimide resin film, or the like.

Each of pixels PX may include the plurality of light emitting units EA1, EA2, and EA3. In FIG. 10, an example in which each of the pixels PX includes first, second, and third light emitting units EA1, EA2, and EA3 is described, but the embodiment of the specification is not limited thereto. The first light emitting unit EA1 may indicate a region which emits first light, the second light emitting unit EA2 may indicate a region which emits second light, and the third light emitting unit EA3 may indicate a region which emits third light. Each of the plurality of light emitting units EA1, EA2, and EA3 represents a region where the first light emitting electrode 171, the light emitting layer 172, and the second light emitting electrode 173 are sequentially stacked and holes from the first light emitting electrode 171 and electrons from the second light emitting electrode 173 are recombined in the light emitting layer 172 to emit light.

The light emitting layer 172 is formed on the first light emitting electrode 171 and the bank 190. The light emitting layer 172 may include an organic material to emit a predetermined color. For example, the light emitting layer 172 includes a hole transporting layer, an organic material layer, and an electron transporting layer.

The second light emitting electrode 173 is formed on the light emitting layer 172. The second light emitting electrode 173 may be formed to cover the light emitting layer 172. The second light emitting electrode 173 may be a common layer commonly formed on the plurality of light emitting units EA1, EA2, and EA3. A capping layer may be formed on the second light emitting electrode 173.

In the top emission structure, the second light emitting electrode 173 may be formed of a transparent conductive oxide (TCO) such as indium tin oxide (ITO) and indium zinc oxide (IZO) capable of transmitting light or a semi-transmissive conductive material such as magnesium (Mg), silver (Ag), or an alloy of magnesium (Mg) and silver (Ag). When the second light emitting electrode 173 is formed of a semi-transmissive conductive material, light emission efficiency may be improved by a micro cavity.

An encapsulation layer TFEL may be disposed on the second light emitting electrode 173. The encapsulation layer TFEL includes at least one inorganic film to prevent the penetration of oxygen or moisture into the light emitting element layer EML. Further, the encapsulation layer TFEL includes at least one organic film to protect the light emitting element layer EML from foreign substances such as dust. For example, the encapsulation layer TFEL includes a first inorganic encapsulation film TFE1, an organic encapsulation film TFE2, and a second inorganic encapsulation film TFE3.

The first inorganic encapsulation film TFE1 may be disposed on the second light emitting electrode 173, the organic encapsulation film TFE2 may be disposed on the first inorganic encapsulation film TFE1, and the second inorganic encapsulation film TFE3 may be disposed on the organic encapsulation film TFE2. The first inorganic encapsulation film TFE1 and the second inorganic encapsulation film TFE3 may be formed of a multilayered film in which one or more inorganic films of a silicon nitride layer, a silicon oxynitride layer, a silicon oxide layer, a titanium oxide layer, and an aluminum oxide layer are alternately stacked. The organic encapsulation film TFE2 may be formed of an acryl resin, an epoxy resin, a phenolic resin, a polyamide resin, a polyimide resin, or the like.

The touch sensing unit 300 may be disposed on the encapsulation layer TFEL. The touch sensing unit 300 may include the second substrate SUB2 and the sensor electrode layer SENL.

The second substrate SUB2 may be made of an insulating material such as a polymer resin. For example, the second substrate SUB2 may include polyimide. The second substrate SUB2 may be a flexible substrate which may be bent, folded, or rolled.

The sensor electrode layer SENL may be disposed on the second substrate SUB2. The sensor electrode layer SENL may include the sensor electrodes SE, the sensor lines SL, and a sensor insulating film TINS.

The sensor electrodes SE and the sensor lines SL may be disposed on the second substrate SUB2. The touch pads TPD may also be disposed on the second substrate SUB2. The sensor electrodes SE, the sensor lines SL, and the touch pads TPD may each be formed of a single layer or multilayer made of one of molybdenum (Mo), aluminum (Al), chromium (Cr), gold (Au), titanium (Ti), nickel (Ni), neodymium (Nd), and copper (Cu), or an alloy thereof.

Since the sensor electrode SE has a mesh shape or net shape, the sensor electrode SE may partially overlap the light emitting region EA. The sensor line SL may also partially overlap the light emitting region EA. Accordingly, since the sensor electrode SE and the sensor line SL do not completely cover the light emitting region EA, light from the light emitting region EA may be emitted in an upward direction.

The sensor insulating film TINS may be disposed on the sensor electrodes SE, the sensor lines SL, and the touch pads TPD. The sensor insulating film TINS may be formed of a multilayered film in which one or more inorganic films of a silicon nitride layer, a silicon oxynitride layer, a silicon oxide layer, a titanium oxide layer, and an aluminum oxide layer are alternately stacked. Alternatively, the sensor insulating film TINS may be formed of an organic film such as an acryl resin film, an epoxy resin film, a phenolic resin film, a polyamide resin film, a polyimide resin film, or the like.

FIG. 10 may illustrate the sensor electrode layer SENL having a one-layer structure in which the sensor electrodes SE, the sensor lines SL, and the touch pads TPD are disposed in one layer, but the embodiment of the specification is not limited thereto. A sensor electrode layer SENL having a two-layer structure in which the sensor electrodes SE are disposed in a different layer from the sensor lines SL and the touch pads TPD may be applied to the touch sensing unit 300. In this case, the sensor lines SL and the touch pads TPD may be disposed on the second substrate SUB2, the sensor insulating layer TINS may be disposed on the sensor lines SL and the touch pads TP, and the sensor electrodes SE may be disposed on the sensor insulating layer TINS. Further, each of the sensor electrodes SE may be connected to the sensor line SL through a contact hole which exposes the sensor line SL by passing through the sensor insulating film TINS.

In FIG. 10, the anti-reflection member PF, the first adhesive member ADH1, and the cover window CW are omitted for convenience of description.

Figure 11:
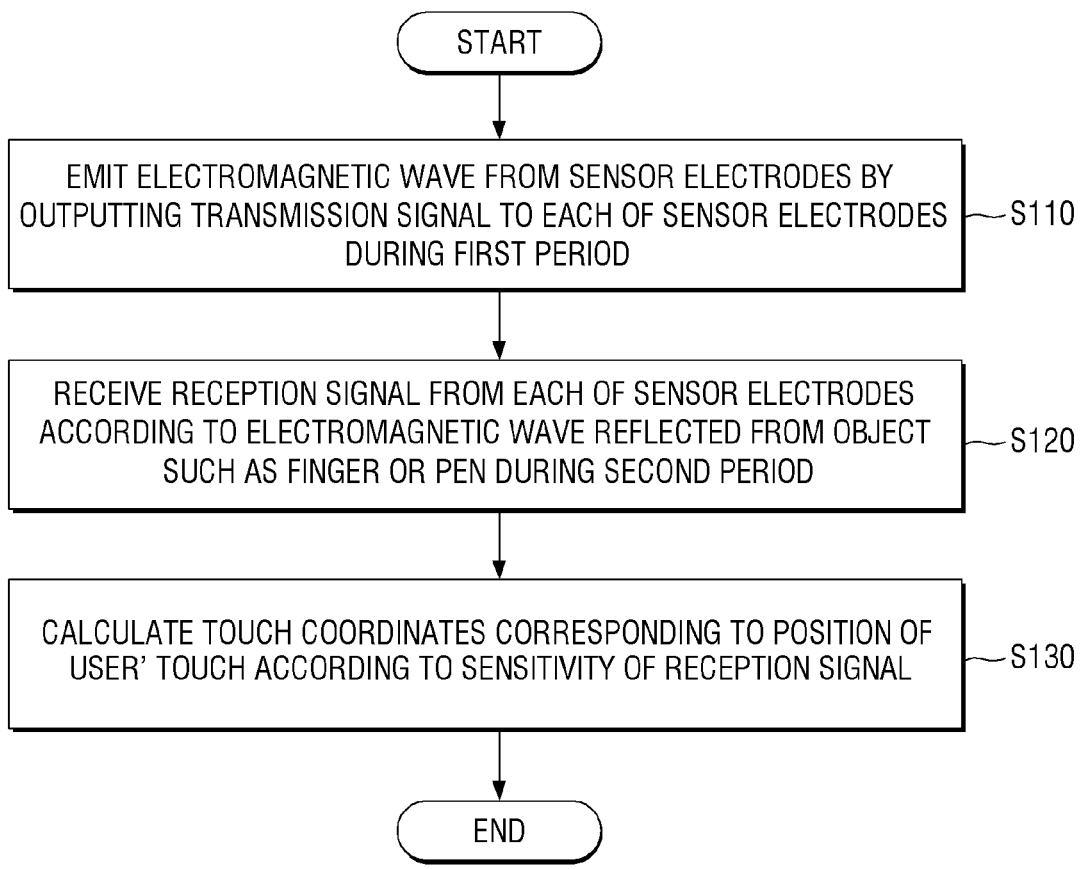
FIG. 11 is a flow chart illustrating a touch sensing method according to one embodiment.
Figure 13:
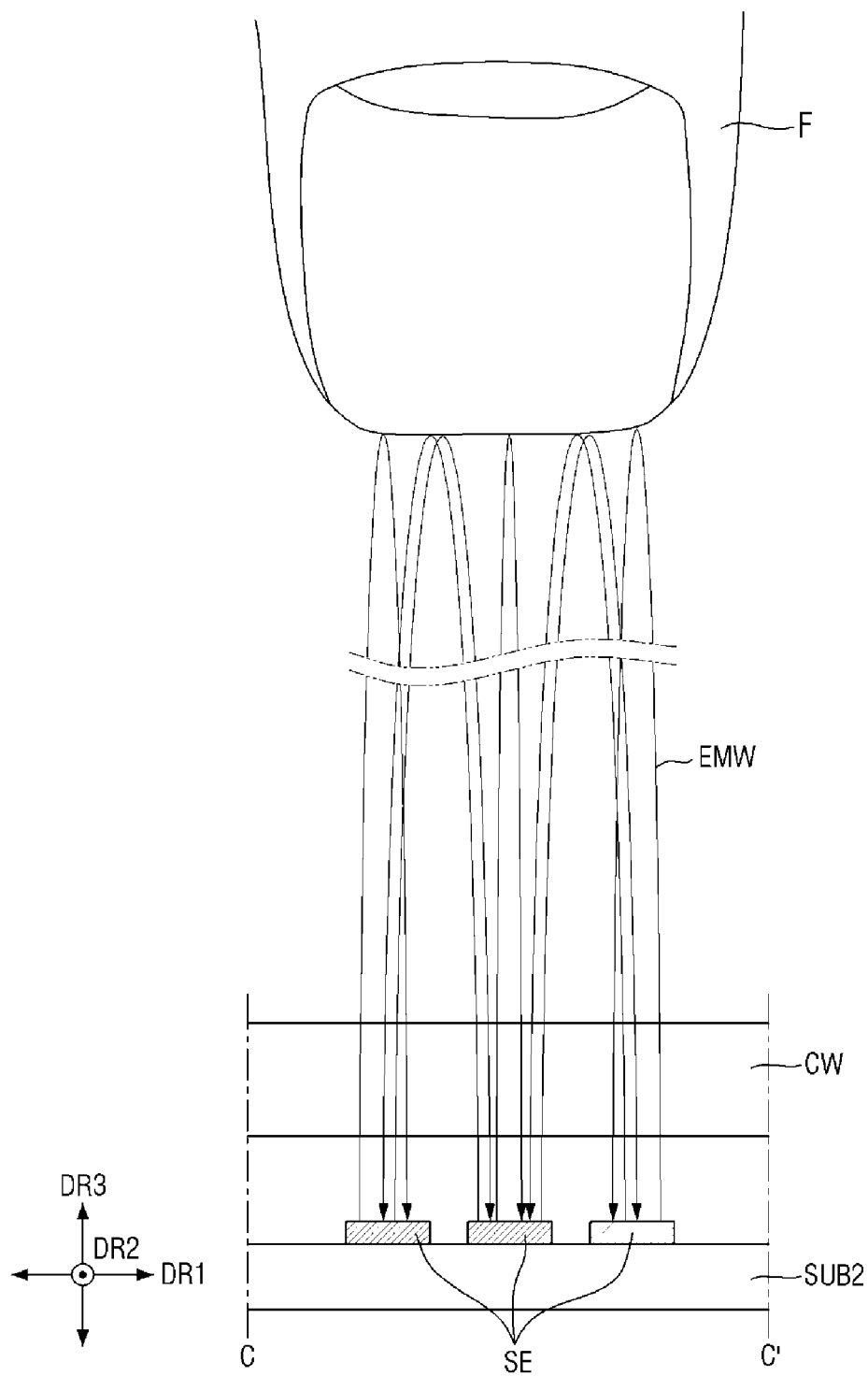
FIG. 13 is an example view illustrating proximity touch sensing using the sensor electrodes taken along line C-C' in FIG. 6.

FIG. 11 is a flow chart illustrating a touch sensing method according to one embodiment. FIG. 12 is an example view illustrating contact touch sensing using the sensor electrodes taken along line C-C' in FIG. 6. FIG. 13 is an example view illustrating proximity touch sensing using the sensor electrodes taken along line C-C' in FIG. 6.

FIGS. 12 and 13 exemplify three sensor electrodes SE arranged in the first direction DR1 in the sensor unit SU in FIG. 6. Hereinafter, the touch sensing method according to one embodiment will be described with reference to FIGS. 11, 12, and, 13.

Firstly, the touch driving circuit 240 outputs a transmission signal to each of the sensor electrodes SE during a first period. Each of the sensor electrodes SE emits an electromagnetic wave EMW according to the transmission signal during the first period. The electromagnetic wave EMW may have a frequency of 10 GHz to 100 GHz. (S110 in FIG. 11)

As shown in FIG. 12, the electromagnetic wave EMW emitted from each of the sensor electrodes SE may be reflected from an object such as a finger F or pen which comes into direct contact with the cover window CW. Alternatively, as shown in FIG. 13, the electromagnetic wave EMW emitted from each of the sensor electrodes SE may be reflected from the object such as the finger F or pen located approximately 1 meter away from the cover window CW.

Secondly, the touch driving circuit 240 may receive a reception signal from each of the sensor electrodes SE according to the electromagnetic wave EMW reflected from the object such as the finger F or pen during a second period. (S120 in FIG. 11)

Thirdly, the reception signal received from each of the sensor electrodes SE may be different according to a position of the object such as the finger F or pen. The touch driving circuit 240 may select the sensor unit SU corresponding to an operator's touch position according to sensitivity of the reception signal. The touch driving circuit 240 may calculate a position of the selected sensor unit SU as touch coordinates. Alternatively, the touch driving circuit 240 may calculate a position of the sensor electrode SE having the highest sensitivity of the reception signal in the selected sensor unit SU as the touch coordinates. (S130 in FIG. 11)

As shown in FIGS. 11, 12, and 13, a proximity touch in addition to a contact touch may be sensed by transmitting and receiving the electromagnetic wave EMW having a frequency of 10 GHz to 100 GHz using the sensor electrodes SE. Further, since the sensor electrodes SE may receive the electromagnetic wave EMW reflected from the object such as the finger F or pen located approximately 1 meter away from the cover window CW, a distance of the proximity touch may be increased to approximately 1 meter.

Further, each of the sensor electrodes SE may be time-division driven to serve as a transmission electrode for the first period and a reception electrode for the second period.

Figure 14:
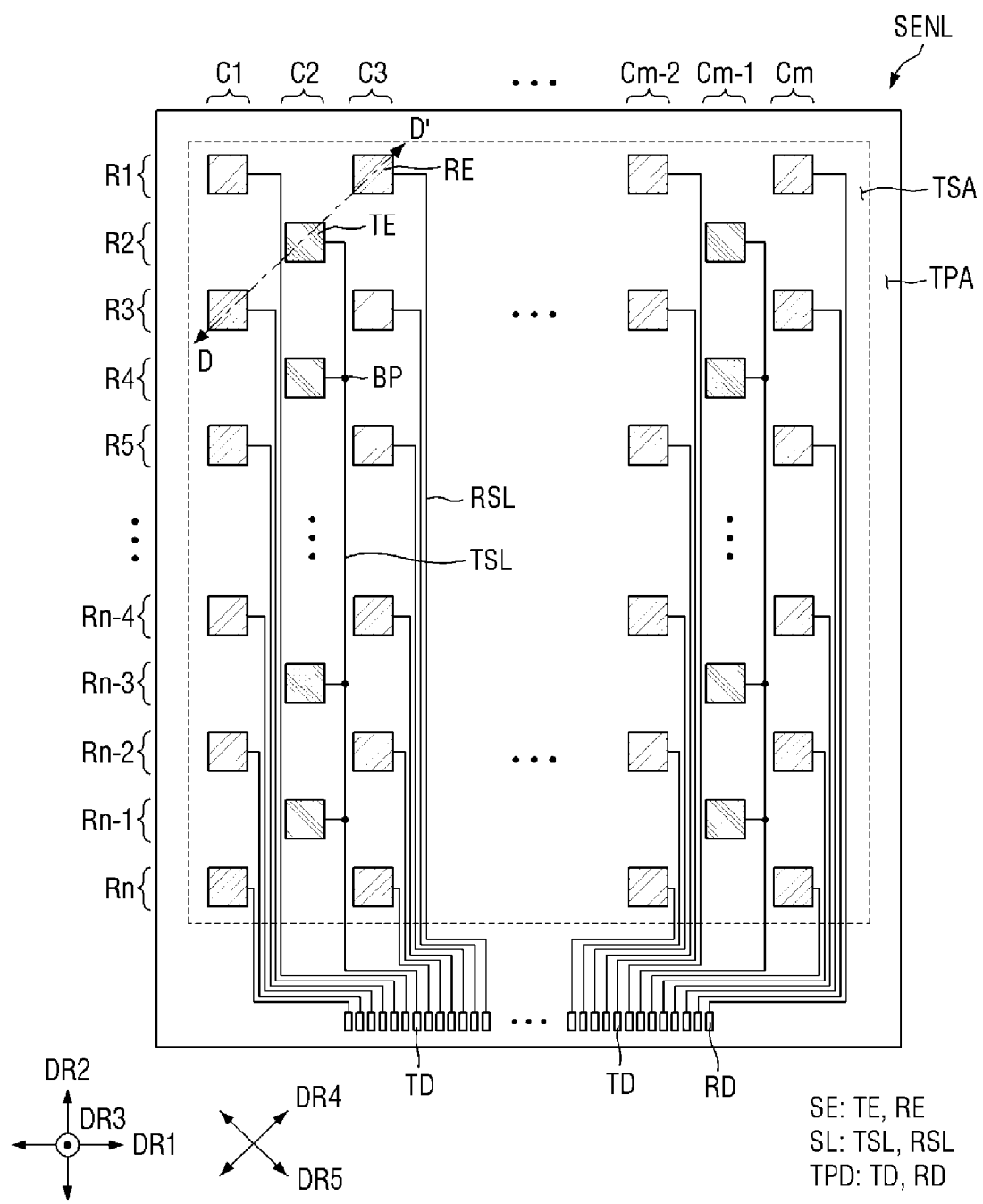
FIG. 14 is a layout view illustrating a touch sensing unit according to another embodiment.

FIG. 14 is a layout view illustrating a touch sensing unit according to another embodiment.

The embodiment in FIG. 14 is different from the embodiment in FIG. 6 in that a plurality of sensor electrodes SE include a plurality of transmission electrodes TE and a plurality of reception electrodes RE.

Referring to FIG. 14, the plurality of transmission electrodes TE may emit the electromagnetic wave according to the transmission signal of the touch driving circuit 240, and the plurality of reception electrodes RE may transmit the reception signal to the touch driving circuit 240 according to the electromagnetic wave reflected by an object such as a human finger or pen.

The plurality of transmission electrodes TE and the plurality of reception electrodes RE may be disposed to be spaced apart from each other. The plurality of transmission electrodes TE and the plurality of reception electrodes RE may be electrically isolated from each other. The plurality of transmission electrodes TE may be disposed in even rows R2, R4, . . . , Rn−1 and even columns C2, C4, . . . , Cm−1. The plurality of reception electrodes RE may be disposed in odd rows R1, R3, Rn and odd columns C1, C3 . . . , Cm.

The plurality of transmission electrodes TE and the plurality of reception electrodes RE may have a rectangular planar shape, a square planar shape, or a circular planar shape. A size of each of the plurality of transmission electrodes TE and a size of each of the plurality of reception electrodes RE may be substantially the same. In order to use the principle of an antenna which transmits and receives an electromagnetic wave having a frequency of 10 to 100 GHz, lengths of the plurality of transmission electrodes TE and the plurality of reception electrodes RE in the first direction DR1 and the second direction DR2 may each be approximately 1 mm to 5 mm The plurality of transmission electrodes TE and the plurality of reception electrodes RE may each include an opaque metal material having low resistance. For example, the plurality of transmission electrodes TE and the plurality of reception electrodes RE may each be formed of a single layer or multilayer made of one of molybdenum (Mo), aluminum (Al), chromium (Cr), gold (Au), titanium (Ti), nickel (Ni), neodymium (Nd), and copper (Cu), or an alloy thereof. In this case, since the touch sensing unit 300 is disposed on the display panel 100, the plurality of transmission electrodes TE and the plurality of reception electrodes RE may each have a mesh shape or net shape so as not to block light emitted from the display panel 100.

At least one transmission electrode TE and the reception electrodes RE disposed in a first diagonal direction DR4 and a second diagonal direction DR5 from the transmission electrode TE may be defined as one sensor unit SU. The first diagonal direction DR4 may be a direction between the first direction DR1 and the second direction DR2, and the second diagonal direction DR5 may be a direction orthogonal to the first diagonal direction DR4.

The sensor unit SU may be a minimum unit in which the touch driving circuit 240 determines a touch position. FIG. 14 illustrates that the sensor unit SU includes one transmission electrode TE and four reception electrodes RE. In this case, the number of the plurality of transmission electrodes TE in the touch sensor region TSA may be smaller than the number of the plurality of reception electrodes RE.

The sensor units SU adjacent to each other in the first direction DR1 or the second direction DR2 may share at least two reception electrodes RE.

The plurality of sensor lines SL may include a plurality of transmission lines TSL and a plurality of reception lines RSL. The plurality of touch pads TPD may include a plurality of transmission pads TD and a plurality of reception pads RD.

The plurality of transmission electrodes TE disposed in one column may be commonly connected to one transmission line TSL. Alternatively, all transmission electrodes TE of the touch sensor region TSA may be commonly connected to one transmission line TSL.

The plurality of reception electrodes RE may be correspondingly connected one-to-one to the plurality of reception lines RSL. Further, the plurality of reception lines RSL may be correspondingly connected one-to-one to the plurality of reception pads RD. That is, any one reception line RSL among the plurality of reception lines RSL may be connected between the reception electrode RE and the reception pad RD to connect any one reception electrode RE among the plurality of reception electrodes RE and any one reception pad RD among the plurality of reception pads RD.

In order to match the impedance between the plurality of reception lines RSL, the plurality of reception lines RSL may each include a winding pattern. Further, the plurality of transmission electrodes TE are commonly connected to one transmission line TSL, but in order to match lengths of branch lines branched from branch points BP of the transmission line TSL, the branch line may include a winding pattern. The branch line may be defined as a line between the branch point BP and the transmission electrode TE.

As shown in FIG. 14, each of the transmission electrodes TE may emit an electromagnetic wave having a frequency of 10 to 100 GHz, and receive the electromagnetic wave reflected from an object such as a human finger or pen using the reception electrodes RE to sense the user's touch. That is, the transmission electrodes TE and the reception electrodes RE may each sense the user's touch using the principle of an antenna which transmits and receives an electromagnetic wave.

Further, since the transmission electrodes TE and the reception electrodes RE are distinguished, there is an advantage in that the time division driving does not need to be performed compared to the embodiment in FIG. 6 in which the electromagnetic wave is transmitted and received using one sensor electrode SE.

Figure 15:
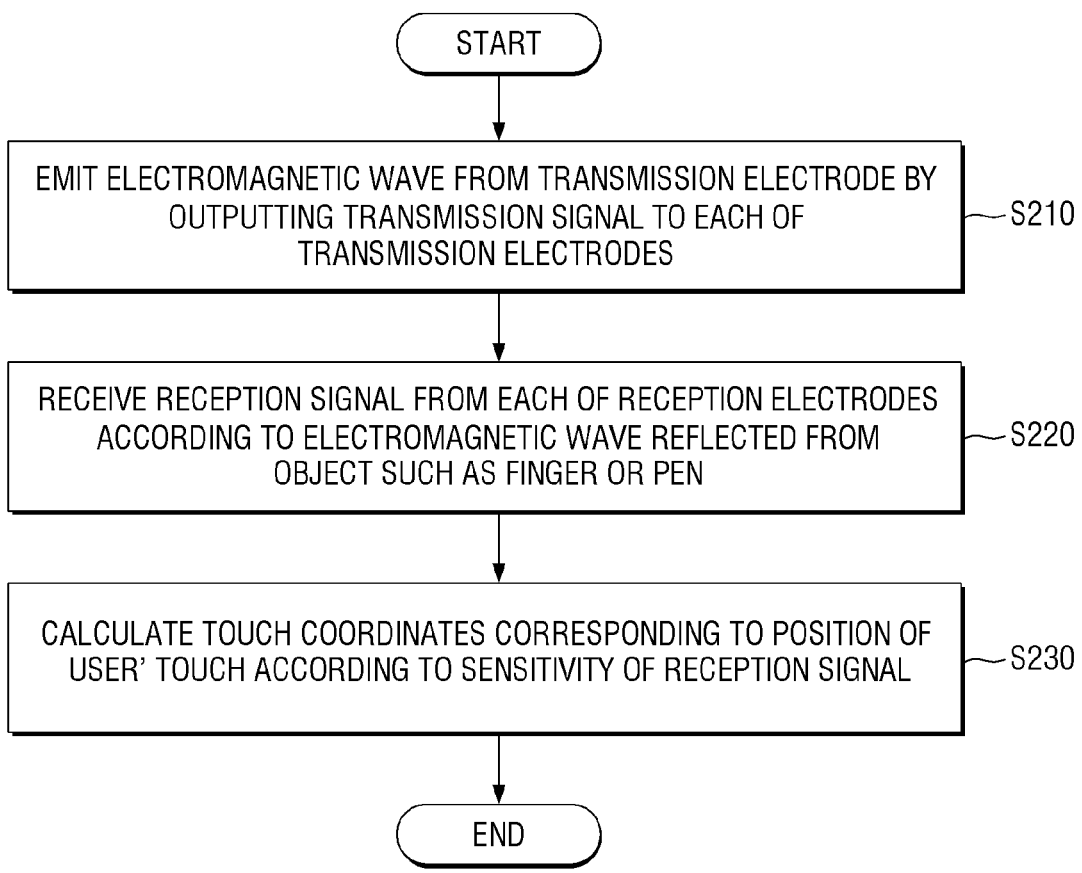
FIG. 15 is a flow chart illustrating a touch sensing method according to another embodiment.
Figure 16:
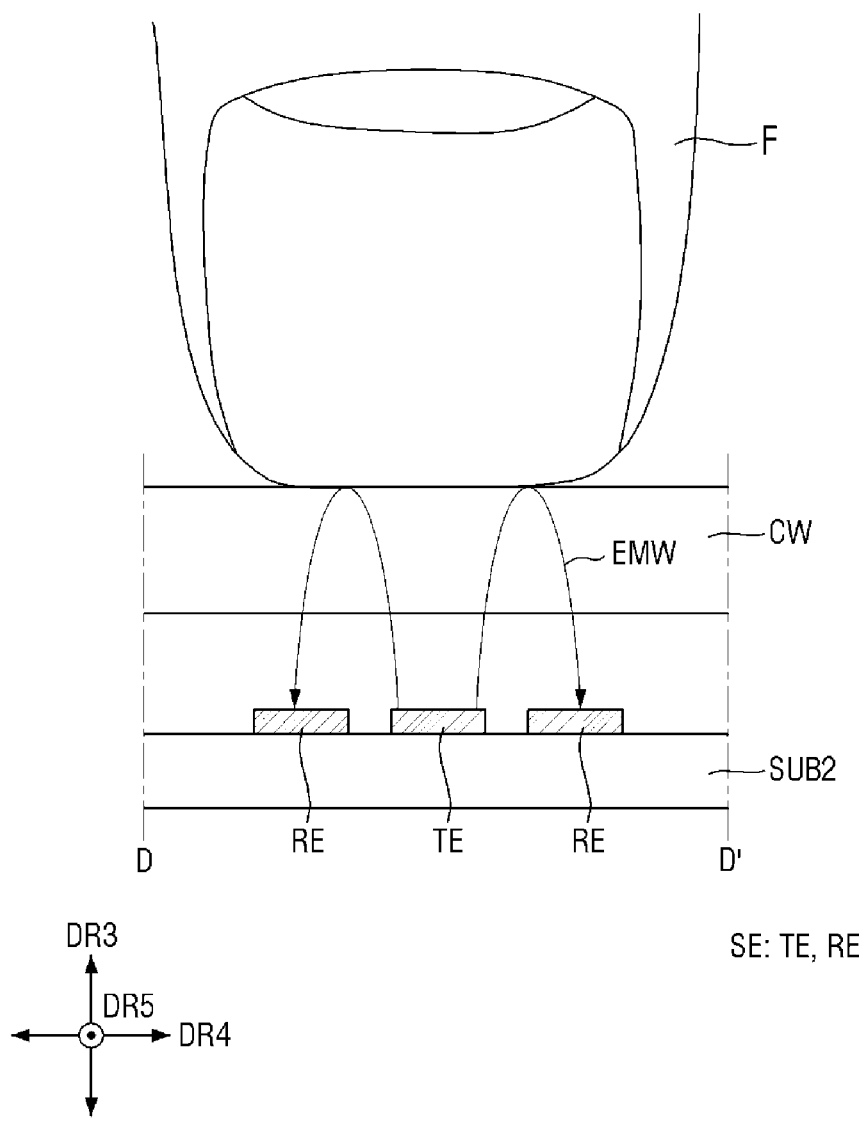
FIG. 16 is an example view illustrating contact touch sensing using sensor electrodes in FIG. 14.
Figure 17:
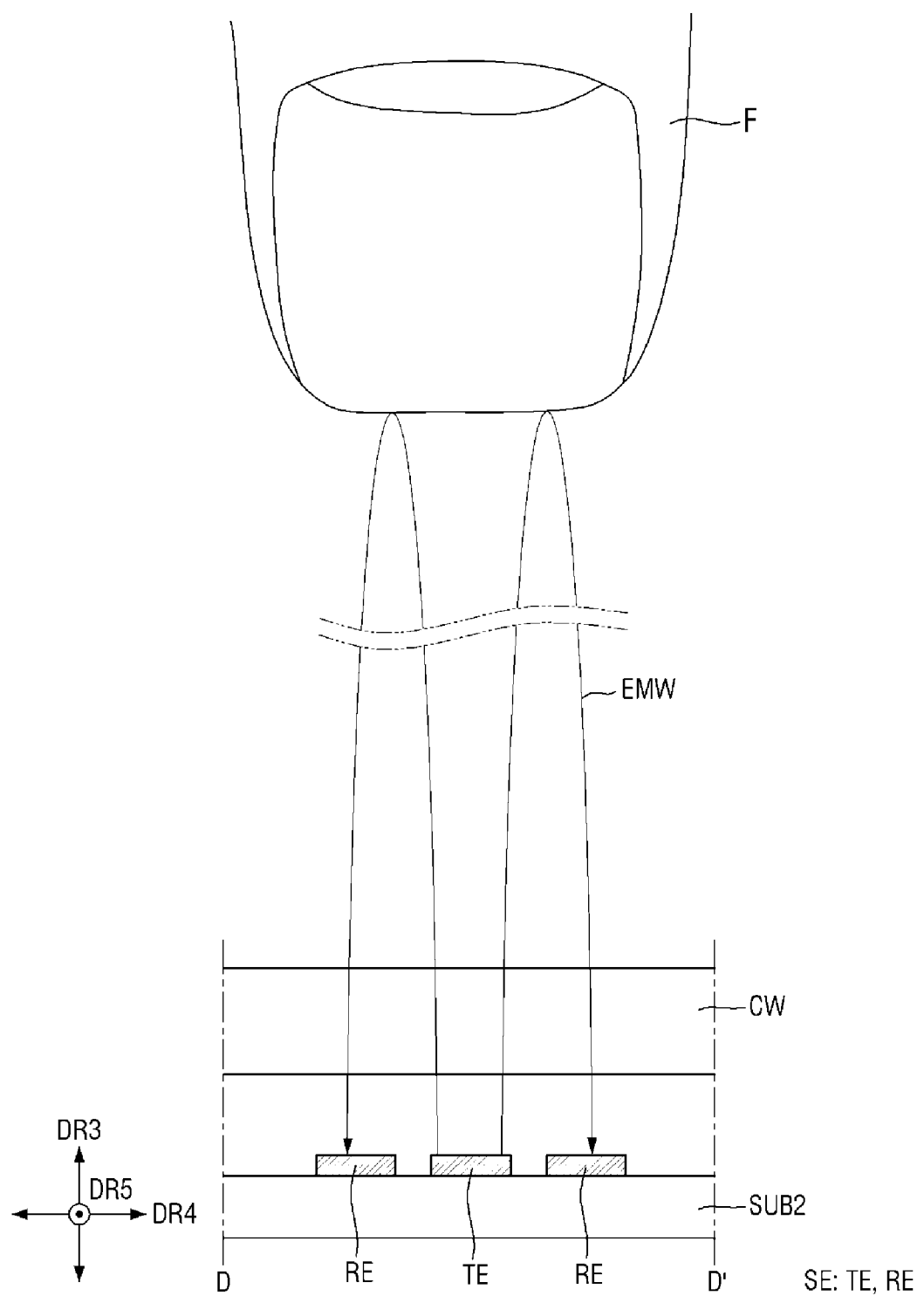
FIG. 17 is an example view illustrating proximity touch sensing using the sensor electrodes in FIG. 14.

FIG. 15 is a flow chart illustrating a touch sensing method according to another embodiment. FIG. 16 is an example view illustrating contact touch sensing using the sensor electrodes in FIG. 14. FIG. 17 is an example view illustrating proximity touch sensing using the sensor electrodes in FIG. 14.

FIGS. 16 and 17 exemplify three sensor electrodes SE arranged in the first diagonal direction DR4 in the sensor unit SU in FIG. 14. Hereinafter, the touch sensing method according to one embodiment will be described with reference to FIGS. 15, 16, and 17.

First, the touch driving circuit 240 outputs a transmission signal to each of the transmission electrodes TE. Each of the transmission electrodes TE emits an electromagnetic wave EMW according to the transmission signal. The electromagnetic wave EMW may have a frequency of 10 GHz to 100 GHz. (S210 in FIG. 15)

As shown in FIG. 16, the electromagnetic wave EMW emitted from the transmission electrode TE may be reflected from an object such as a finger F or pen which comes into direct contact with the cover window CW. Alternatively, as shown in FIG. 17, the electromagnetic wave EMW emitted from the transmission electrode TE may be reflected from the object such as the finger F or pen located approximately 1 meter away from the cover window CW.

Second, the touch driving circuit 240 may receive a reception signal from each of the reception electrodes RE according to the electromagnetic wave EMW reflected from the object such as the finger F or pen. (S220 in FIG. 15)

Third, the reception signal received from each of the reception electrodes RE may be different according to a position of the object such as the finger F or pen. The touch driving circuit 240 may select the sensor unit SU corresponding to an operator's touch position according to sensitivity of the reception signal. The touch driving circuit 240 may calculate the selected sensor unit SU as touch coordinates. Alternatively, the touch driving circuit 240 may calculate a position of the reception electrode RE having the highest sensitivity of the reception signal in the selected sensor unit SU as the touch coordinates. Alternatively, the touch driving circuit 240 may calculate a specific position between the reception electrodes RE as touch coordinates according to the sensitivity of each of the reception signals received from the reception electrodes RE of the selected sensor unit SU. (S230 in FIG. 15)

As shown in FIGS. 15, 16, and 17, a proximity touch in addition to a contact touch may be sensed by transmitting and receiving the electromagnetic wave EMW having a frequency of 10 GHz to 100 GHz using the transmission electrodes TE and the reception electrodes RE. Further, since the reception electrodes RE may receive the electromagnetic wave EMW reflected from the object such as the finger F or pen located approximately 1 meter away from the cover window CW, a distance of the proximity touch may be increased to approximately 1 meter.

In a touch sensing unit and a display device including the same according to embodiments, since each of sensor electrodes of the touch sensing unit emits an electromagnetic wave having a frequency of 10 GHz to 100 GHz, and receives an electromagnetic wave reflected from an object such as a human finger or pen, a user's touch can be sensed. That is, the sensor electrodes can each sense the user's touch using the principle of an antenna which transmits and receives an electromagnetic wave.

In the touch sensing unit and the display device including the same according to the embodiments, a proximity touch in addition to a contact touch can be sensed by transmitting and receiving the electromagnetic wave having a frequency of 10 GHz to 100 GHz using the sensor electrodes of the touch sensing unit. Further, since the sensor electrodes can receive an electromagnetic wave reflected from an object such as a human finger or pen located at a distance of approximately 1 meter from a cover window, a distance of the proximity touch can be increased to approximately 1 meter.

In the touch sensing unit and the display device including the same according to the embodiments, when the touch sensing unit is disposed on a display panel, an anti-reflection member, a first adhesive member, and a cover window through which the electromagnetic wave can pass can be disposed on the touch sensing unit. Accordingly, the touch sensing unit can sense the user's touch by emitting the electromagnetic wave and receiving the electromagnetic wave reflected from an object such as a human finger or pen disposed on the cover window.

In the touch sensing unit and the display device including the same according to the embodiments, when the touch sensing unit is disposed on the anti-reflection member or the cover window, since a distance between a sensor electrode layer of the touch sensing unit and a display layer of the display panel can increase, the parasitic capacitance between the sensor electrodes of the sensor electrode layer of the touch sensing unit and electrodes of the display layer of the display panel can decrease. Accordingly, it is possible to reduce the influence of the sensor electrodes of the sensor electrode layer of the touch sensing unit by a voltage change of the electrodes of the display layer of the display panel.

Effects according to the embodiments are not limited by the above-described contents, and more various effects are included in the specification.

What is claimed is:

1. A display device comprising:
   a display panel including a plurality of light emitting regions;
   a touch sensing unit disposed on the display panel and including transmission electrodes and reception electrodes; and
   a touch driving circuit configured to transmit a transmission signal to each of the transmission electrodes to transmit an electromagnetic wave from the each of the transmission electrodes, and receive a reception signal from each of the reception electrodes receiving the electromagnetic wave reflected by an object,
   wherein the electromagnetic wave has a frequency of 10 GHz to 100 GHz,
   wherein one transmission electrode among the transmission electrodes, and a plurality of reception electrodes disposed adjacent to the one transmission electrode is defined as one sensor unit,
   wherein an area of the one transmission electrode is substantially equal to an area of each of one reception electrode among the plurality of reception electrodes which surround the one transmission electrode,
   wherein the touch driving circuit is configured to select one sensor unit among a plurality of sensor units which has a highest sensitivity of the reception signal, and calculate a position of a selected sensor unit as a touch coordinate, and
   wherein the display panel further comprises a transmission line commonly connected to a plurality of transmission electrodes disposed adjacent to each other in a same direction, and the transmission line further comprises a winding pattern on a branch line disposed in a touch sensor region and elongated from a branch point of the transmission line to each of the plurality of transmission electrodes.

2. The display device of claim 1, wherein a number of transmission electrodes is smaller than a number of reception electrodes.

3. The display device of claim 1, wherein:
   the transmission electrodes are arranged in a first direction and a second direction intersecting the first direction;
   the reception electrodes are arranged in the first direction and the second direction.

4. The display device of claim 1, further comprising:
   transmission lines commonly connected to the transmission electrodes; and
   reception lines correspondingly connected one-to-one to the reception electrodes.

* * * * *